US011606819B2

(12) United States Patent
Islam et al.

(10) Patent No.: US 11,606,819 B2
(45) Date of Patent: Mar. 14, 2023

(54) INDEXING OF RANDOM ACCESS OCCASIONS FOR CHANNEL STATE INFORMATION REFERENCE SIGNAL BASED RANDOM ACCESS PROCEDURES

(71) Applicant: QUALCOMM Incorporated, San Diego, CA (US)

(72) Inventors: Muhammad Nazmul Islam, Littleton, MA (US); Hung Dinh Ly, San Diego, CA (US); Junsheng Han, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/596,167

(22) Filed: Oct. 8, 2019

(65) Prior Publication Data

US 2020/0146068 A1    May 7, 2020

Related U.S. Application Data

(60) Provisional application No. 62/755,350, filed on Nov. 2, 2018.

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC ........... H04W 74/0833; H04W 74/006; H04W 74/008; H04L 5/0053; H04L 5/0091; H04L 5/0048
See application file for complete search history.

(56) References Cited

U.S. PATENT DOCUMENTS

| | | | |
|---|---|---|---|
| 2018/0220450 A1* | 8/2018 | Aiba | H04W 74/004 |
| 2019/0053235 A1* | 2/2019 | Novlan | H04L 43/0876 |
| 2019/0132882 A1* | 5/2019 | Li | H04W 74/0816 |
| 2019/0254071 A1* | 8/2019 | Park | H04W 76/11 |
| 2020/0068616 A1* | 2/2020 | Qian | H04W 74/002 |
| 2020/0137806 A1* | 4/2020 | Islam | H04L 1/0071 |
| 2020/0146070 A1* | 5/2020 | Xiong | H04L 1/0045 |

(Continued)

FOREIGN PATENT DOCUMENTS

WO    WO-2019220647 A1 *  11/2019

*Primary Examiner* — Derrick W Ferris
*Assistant Examiner* — Chuong M Nguyen
(74) *Attorney, Agent, or Firm* — Holland & Hart LLP

(57) ABSTRACT

Methods, systems, and devices for wireless communications are described. Generally, Generally, a base station may send to a user equipment (UE) a configuration message, which may include an indication of one or more CSI-RS resources and one or more random access occasion indices. The UE may identify one or more random access occasions associated with the UE based on the CSI-RS resources, the random access occasion indices for the UE, and a random access occasion index reset time. The random access occasion index rest time may be based on a fixed time period. The random access occasion index reset time may be based on a number of CSI-RS resources. In some examples, the random access occasion index reset time may be based on a number of actually transmitted synchronization signal blocks (SSBs).

25 Claims, 17 Drawing Sheets

(56) References Cited

U.S. PATENT DOCUMENTS

| | | | | |
|---|---|---|---|---|
| 2020/0154377 A1* | 5/2020 | Qian | ............... | H04L 5/0048 |
| 2020/0220605 A1* | 7/2020 | Xu | ............... | H04L 5/0051 |
| 2020/0351853 A1* | 11/2020 | Xiong | ............... | H04W 74/006 |
| 2021/0014889 A1* | 1/2021 | Liu | ............... | H04B 7/0626 |
| 2021/0243810 A1* | 8/2021 | Turtinen | ............... | H04W 74/04 |
| 2021/0352734 A1* | 11/2021 | Svedman | ............... | H04W 72/1263 |

* cited by examiner

INDEXING OF RANDOM ACCESS OCCASIONS FOR CHANNEL STATE INFORMATION REFERENCE SIGNAL BASED RANDOM ACCESS PROCEDURES

CROSS REFERENCE

The present Application for Patent claims the benefit of U.S. Provisional Patent Application No. 62/755,350 by ISLAM et al., entitled "INDEXING OF RANDOM ACCESS OCCASIONS FOR CHANNEL STATE INFORMATION REFERENCE SIGNAL BASED RANDOM ACCESS PROCEDURES," filed Nov. 2, 2018, assigned to the assignee hereof, and which is expressly incorporated by reference herein.

BACKGROUND

The following relates generally to wireless communications, and more specifically to indexing of random access occasions for channel state information reference signal (CSI-RS) based random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station and a UE may perform CSI-RS based random access procedures. For example, a base station may configure a UE with a set of random access occasions for transmitting random access channel (RACH) signals. The set of random access occasions may correspond to one or more CSI-RSs transmitted from the base station (e.g., each transmitted CSI-RS may correspond to one or more random access occasions). The base station may also communicate to the UE one or more random access occasion indices for the UE, each index of the one or more random access occasion indices corresponding to one of the one or more random access occasions. The random access occasion indices may indicate which random access occasion a UE is to utilize. However, random access occasion indices may be reset, or the random access occasion indices may become infinite across time. Conventional approaches to resetting the random access occasion indices may be insufficient.

SUMMARY

The described techniques relate to improved methods, systems, devices, and apparatuses that support indexing of random access occasions for channel state information reference signal (CSI-RS) based random access procedures. Generally, a base station may send to a user equipment (UE) a configuration message, which may include an indication of one or more CSI-RS resources. The configuration message may further include one or more random access occasion indices for the receiving UE. The random access occasion indices may indicate which random access occasion(s) the UE may use for random access procedures from a set of possible random access occasions. The UE may identify one or more random access occasions associated with the UE based on the CSI-RS resources, the random access occasion indices for the UE, and a random access occasion index reset time. In some examples, the random access occasion index rest time may be based on a fixed time period, which may be standardized or configured by the base station. In some examples, the random access occasion index reset time may be based on a number of CSI-RS resources. For instance, the random access occasion index reset time may be based on the number of CSI-RS signals configured for contention free random access transmission by the UE, or the random access occasion index reset time may be based on the total number of CSI-RS resources associated with corresponding random access occasions at the base station. In some examples, the random access occasion index reset time may be based on a number of actually transmitted synchronization signal blocks.

A method of wireless communications at a UE is described. The method may include receiving, from a base station, a configuration message including an indication of one or more channel state information reference signal resources, and one or more random access occasion indices for the UE, identifying one or more random access occasions associated with the UE based on the channel state information reference signal resources, the random access occasion indices for the UE, and a random access occasion index reset time, where the random access occasion index reset time is based on one or more of: a fixed time period or a number of the one or more channel state information reference signal resources, and performing a random access procedure with the base station according to the identified one or more random access occasions.

An apparatus for wireless communications at a UE is described. The apparatus may include a processor, memory in electronic communication with the processor, and instructions stored in the memory. The instructions may be executable by the processor to cause the apparatus to receive, from a base station, a configuration message including an indication of one or more channel state information reference signal resources, and one or more random access occasion indices for the UE, identify one or more random access occasions associated with the UE based on the channel state information reference signal resources, the random access occasion indices for the UE, and a random access occasion index reset time, where the random access occasion index reset time is based on one or more of: a fixed time period or a number of the one or more channel state information reference signal resources, and perform a random access procedure with the base station according to the identified one or more random access occasions.

Another apparatus for wireless communications at a UE is described. The apparatus may include means for receiving, from a base station, a configuration message including an indication of one or more channel state information reference signal resources, and one or more random access occasion indices for the UE, identifying one or more random access occasions associated with the UE based on the channel state information reference signal resources, the random access occasion indices for the UE, and a random access occasion index reset time, where the random access occasion index reset time is based on one or more of: a fixed time period or a number of the one or more channel state information reference signal resources, and performing a random access procedure with the base station according to the identified one or more random access occasions.

A non-transitory computer-readable medium storing code for wireless communications at a UE is described. The code may include instructions executable by a processor to receive, from a base station, a configuration message including an indication of one or more channel state information reference signal resources, and one or more random access occasion indices for the UE, identify one or more random access occasions associated with the UE based on the channel state information reference signal resources, the random access occasion indices for the UE, and a random access occasion index reset time, where the random access occasion index reset time is based on one or more of: a fixed time period or a number of the one or more channel state information reference signal resources, and perform a random access procedure with the base station according to the identified one or more random access occasions.

Some examples of the method, apparatuses, and non-transitory computer-readable medium described herein may further include operations, features, means, or instructions for receiving an indication of the fixed time period from the base station, where the random access occasion index reset time may be equal to the fixed time period.

In some examples of the method, apparatuses, and non-transitory computer-readable medium described herein, the fixed time period includes the one or more random access occasions associated with the UE.

In some examples of the method, apparatuses, and non-transitory computer-readable medium described herein, the indication may be received in system information, downlink control information, a media access control control element (MAC-CE), a radio resource control (RRC) signal, a handover report, or any combination thereof.

In some examples of the method, apparatuses, and non-transitory computer-readable medium described herein, the fixed time period may be standardized.

In some examples of the method, apparatuses, and non-transitory computer-readable medium described herein, the random access occasion index reset time may be based on a maximum random access occasion.

Some examples of the method, apparatuses, and non-transitory computer-readable medium described herein may further include operations, features, means, or instructions for receiving an indication of the number of the one or more channel state information reference signal resources from the base station.

In some examples of the method, apparatuses, and non-transitory computer-readable medium described herein, the number of the one or more channel state information reference signal resources may be equal to a number of channel state information reference signals configured for contention free random access transmission by the UE.

In some examples of the method, apparatuses, and non-transitory computer-readable medium described herein, the number of the one or more channel state information reference signal resources may be a total number of channel state information reference signal resources associated with corresponding random access occasions at the base station.

Some examples of the method, apparatuses, and non-transitory computer-readable medium described herein may further include operations, features, means, or instructions for receiving a configuration of a number of actually transmitted synchronization signal blocks (SSBs), where the random access occasion index reset time may be based on the number of actually transmitted SSBs.

A method of wireless communications at a base station is described. The method may include transmitting, to a UE, a configuration message including an indication of one or more channel state information reference signal resources for the UE, and one or more random access occasion indices for the UE, identifying one or more random access occasions associated with the UE based on the channel state information reference signal resources for the UE, the random access occasion indices for the UE, and a random access occasion index reset time, where the random access occasion index reset time is based on one or more of: a fixed time period or a number of the one or more channel state information reference signal resources assigned to the UE, and performing a random access procedure with the UE according to the identified one or more random access occasions.

An apparatus for wireless communications at a base station is described. The apparatus may include a processor, memory in electronic communication with the processor, and instructions stored in the memory. The instructions may be executable by the processor to cause the apparatus to transmit, to a UE, a configuration message including an indication of one or more channel state information reference signal resources for the UE, and one or more random access occasion indices for the UE, identify one or more random access occasions associated with the UE based on the channel state information reference signal resources for the UE, the random access occasion indices for the UE, and a random access occasion index reset time, where the random access occasion index reset time is based on one or more of: a fixed time period or a number of the one or more channel state information reference signal resources assigned to the UE, and perform a random access procedure with the UE according to the identified one or more random access occasions.

Another apparatus for wireless communications at a base station is described. The apparatus may include means for transmitting, to a UE, a configuration message including an indication of one or more channel state information reference signal resources for the UE, and one or more random access occasion indices for the UE, identifying one or more random access occasions associated with the UE based on the channel state information reference signal resources for the UE, the random access occasion indices for the UE, and a random access occasion index reset time, where the random access occasion index reset time is based on one or more of: a fixed time period or a number of the one or more channel state information reference signal resources assigned to the UE, and performing a random access procedure with the UE according to the identified one or more random access occasions.

A non-transitory computer-readable medium storing code for wireless communications at a base station is described. The code may include instructions executable by a processor to transmit, to a UE, a configuration message including an indication of one or more channel state information reference signal resources for the UE, and one or more random access occasion indices for the UE, identify one or more random access occasions associated with the UE based on the channel state information reference signal resources for the UE, the random access occasion indices for the UE, and a random access occasion index reset time, where the random access occasion index reset time is based on one or more of: a fixed time period or a number of the one or more channel state information reference signal resources assigned to the UE, and perform a random access procedure with the UE according to the identified one or more random access occasions.

Some examples of the method, apparatuses, and non-transitory computer-readable medium described herein may further include operations, features, means, or instructions for transmitting an indication of the fixed time period to the UE, where the random access occasion index reset time may be equal to the fixed time period.

In some examples of the method, apparatuses, and non-transitory computer-readable medium described herein, the fixed time period includes the one or more random access occasions associated with the UE.

In some examples of the method, apparatuses, and non-transitory computer-readable medium described herein, the indication may be transmitted in system information, downlink control information, a MAC-CE, a RRC signal, a handover report, or any combination thereof.

In some examples of the method, apparatuses, and non-transitory computer-readable medium described herein, the fixed time period may be standardized.

In some examples of the method, apparatuses, and non-transitory computer-readable medium described herein, the random access occasion index reset time may be based on a maximum random access occasion.

Some examples of the method, apparatuses, and non-transitory computer-readable medium described herein may further include operations, features, means, or instructions for transmitting an indication of the number of the one or more channel state information reference signal resources to the UE.

In some examples of the method, apparatuses, and non-transitory computer-readable medium described herein, the number of the one or more CSI-RS resources may be equal to a number of channel state information reference signals configured for contention free random access transmission by the UE.

In some examples of the method, apparatuses, and non-transitory computer-readable medium described herein, the number of the one or more channel state information reference signal resources may be a total number of channel state information reference signal resources associated with corresponding random access occasions at the base station.

Some examples of the method, apparatuses, and non-transitory computer-readable medium described herein may further include operations, features, means, or instructions for transmitting a configuration of a number of actually transmitted SSBs, where the random access occasion index reset time may be based on the number of actually transmitted SSBs.

DETAILED DESCRIPTION

Figure 1:
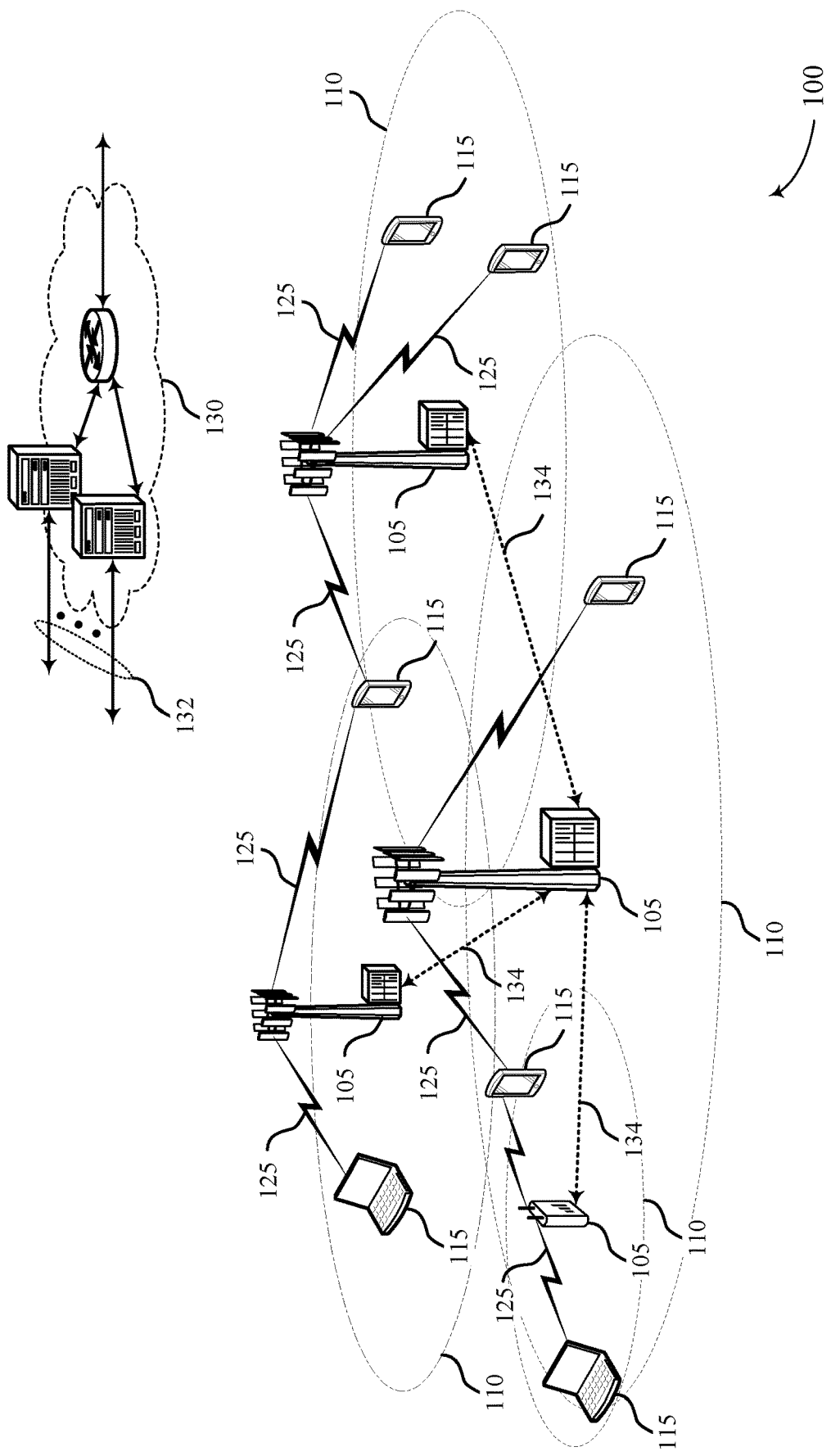
FIG. 1 illustrates an example of a system for wireless communications that supports indexing of random access occasions for channel state information reference signal (CSI-RS) based random access procedures in accordance with aspects of the present disclosure.

In some examples of a wireless communications system, a base station and a user equipment (UE) may perform channel state information reference signal (CSI-RS) based random access procedures. In some examples, (e.g., in NR or other 5G systems) base stations and UEs may communicate via highly directional beams. In some examples, random access occasions (e.g., one or more resources allocated for random access procedures) may correspond to particular beams. Preferred beams may be identified based on reference signal transmissions (e.g., CSI-RS signaling) and the UE and the base station may perform random access channel (RACH) signaling using random access occasions that correspond to one or more CSI-RSs.

A base station may configure a UE with a set of random access occasions for transmitting RACH signals. The set of random access occasions may correspond to one or more CSI-RSs transmitted from the base station. For example, the base station may indicate a set of indexed CSI-RS resources. A first CSI-RS resource may correspond to a subset of random access occasions, a second CSI-RS resource may correspond to a second subset of random access occasions, etc. The base station may also communicate to the UE one or more random access occasion indices for the UE, each index of the one or more random access occasion indices corresponding to one of the one or more random access occasions. The UE may identify one or more random access occasions for performing random access procedures based on the random access occasion indices, and a random access occasion index reset time.

The random access occasion index reset time may indicate a time period after which the random occasion indices reset. If the random access occasion index reset time is not reset periodically, then the indices may be infinite across an infinite amount of time. Further, if a UE wakes up after the initiation of the random access occasion index reset time, then the UE may be unable to index the correct random access occasion corresponding to a particular CSI-RS. If the UE determines the random access occasion index reset time and receives the random access occasion indices, then the UE may successfully identify the random access occasions corresponding to the received CSI-RS resources. A set of N random access occasion indices may range from 0 to N-1 across the random access occasion index reset time, and then may reset at 0 upon expiration of the random access occasion index reset time. The random access occasion index reset time may be configured to allow the network to include a sufficient number of random access occasions corresponding to all actually transmitted CSI-RS resources.

In some examples, the random access occasion index reset time may be fixed. In one example, the fixed time may be standardized. In another example, the network may explicitly configure the random access occasion index reset time. The network may determine the random access occasion index reset time as a function of actually transmitted CSI-RSs, such that a high number of CSI-RSs may result in a proportionally increased random access occasion index reset time and a low number of CSI-RSs may result in a proportionally decreased random access occasion index reset time.

In some examples, the random access occasion index reset time may be determined by the UE based on a number of CSI-RS resources. For instance, the UE may be configured with a table identifying a relationship between a number of CSI-RS resources and random access occasion index reset times. The UE may receive an indication from the base station of a number of CSI-RS resources, and may determine the random access occasion index reset time based on the table (e.g., based on a relationship between the number of CSI-RS resources and the random access occasion index reset time). In some examples, the number of CSI-RS resources may be equal to the number of CSI-RSs configured for contention free random access transmission by the UE. In some examples, the number of CSI-RS resources may be equal to the total number of CSI-RS resources associated with corresponding random access occasions at the base station. In some examples, the UE may receive a configuration of actually transmitted synchronization signal blocks (SSBs), and the random access occasion index reset time may be based on the number of actually transmitted SSBs. In such examples, the random access occasion index reset time may be further based on an SSB random access association period. A random access occasion index reset time may be determined by setting the ratio of the random access occasion index reset time to the SSB random access association period equal to the ratio of configured CSI-RS resources to the number of actually transmitted SSBs, and rounding the resulting random access occasion index reset time to match a transmission time interval (TTI) boundary.

Particular aspects of the subject matter described herein may be implemented to realize one or more advantages. The described techniques may support improvements in resetting random access occasion indices, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to resource allocation schemes, and process flows. Aspects of the disclosure are further illustrated by and described with reference to apparatus diagrams, system diagrams, and flowcharts that relate to indexing of random access occasions for CSI-RS based random access procedures.

FIG. 1 illustrates an example of a wireless communications system 100 that supports indexing of random access occasions for CSI-RS based random access procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, (e.g., in the range of 300 megahertz (MHz) to 300 gigahertz (GHz)). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a base station 105 may send to a UE 115 a configuration message, which may include an indication of one or more CSI-RS resources. The configuration message may further include one or more random access occasion indices for the receiving UE 115. The random access occasion indices may indicate which random access occasion(s) the UE 115 may use for random access procedures from a set of possible random access occasions. The UE 115 may identify one or more random access occasions associated with the UE 115 based on the CSI-RS resources, the random access occasion indices for the UE 115, and a random access occasion index reset time. In some examples, the random access occasion index rest time may be based on a fixed time period, which may be standardized or configured by the base station. In some examples, the random access occasion index reset time may be based on a number of CSI-RS resources. For instance, the random access occasion index reset time may be based on the number of CSI-RS signals configured for contention free random access transmission by the UE 115, or the random access occasion index reset time may be based on the total number of CSI-RS resources associated with corresponding random access occasions at the base station 105. In some examples, the random access occasion index reset time may be based on a number of actually transmitted synchronization signal blocks.

In some examples, the UE 115 may receive, from a base station, a configuration message including an indication of one or more channel state information reference signal resources, and one or more random access occasion indices for the UE, identify one or more random access occasions associated with the UE based on the channel state information reference signal resources, the random access occasion indices for the UE, and a random access occasion index reset time, where the random access occasion index reset time is based on one or more of: a fixed time period or a number of the one or more channel state information reference signal resources, and perform a random access procedure with the base station according to the identified one or more random access occasions. Some advantages to the UE 115 receiving a configuration message, identifying one or more random access occasions, and performing a random access procedure may include decreased system congestion, improved system efficiency, improved battery life, and improved user experience.

In some examples, the UE 115 may receive an indication of the fixed time period from the base station, wherein the random access occasion index reset time is equal to the fixed time period. Some advantages to the UE 115 receiving the indication of the fixed time period may include decreased system congestion, improved system efficiency, improved battery life, and improved user experience.

In some examples, the UE 115 may receive an indication of the number of the one or more channel state information reference signal resources from the base station. Some advantages to the UE 115 receiving the indication of the number of the one or more channel state information reference signal resources may include decreased system congestion, improved system efficiency, improved battery life, and improved user experience.

Figure 2:
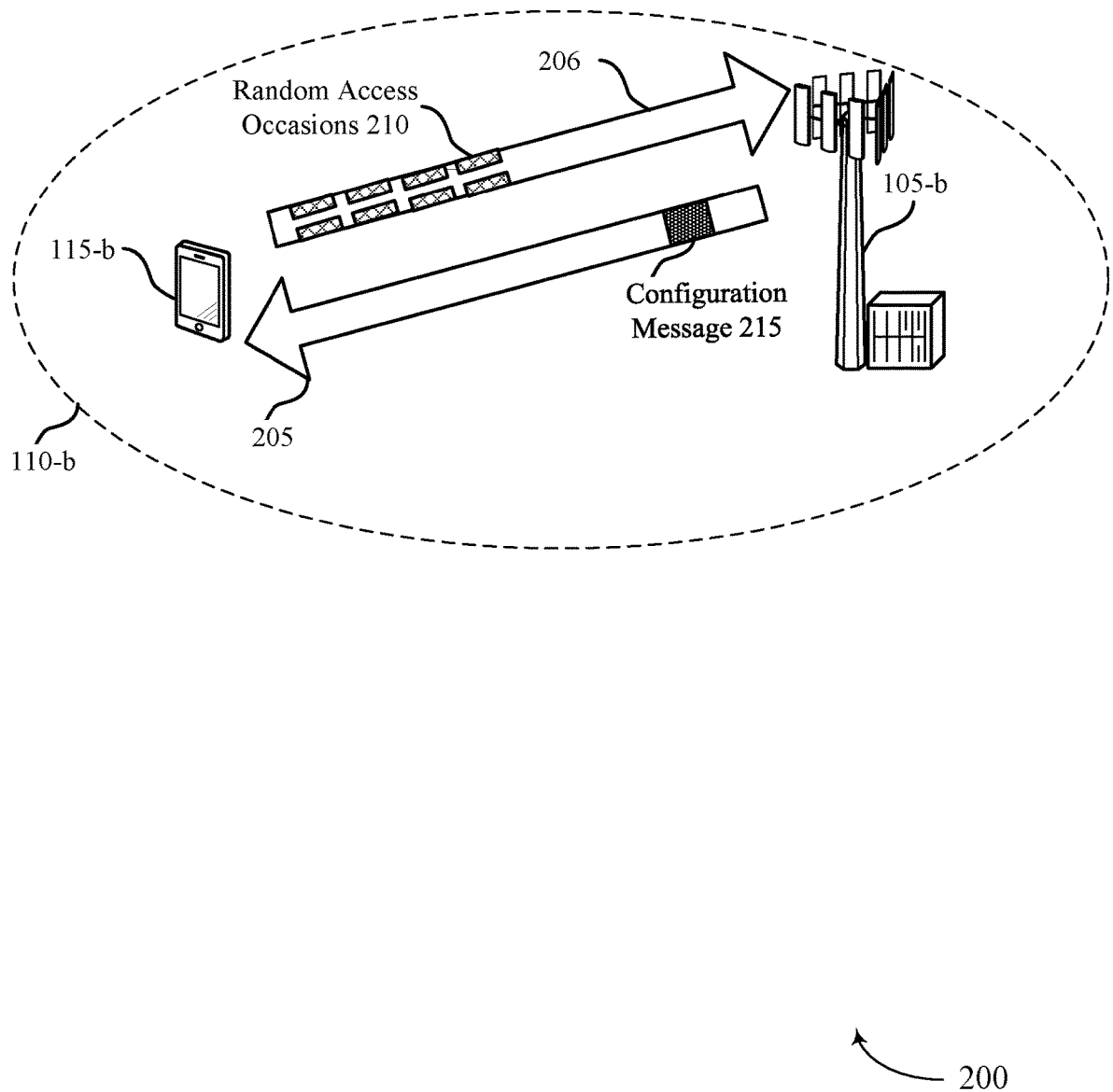
FIG. 2. illustrates an example of a wireless communications system that supports indexing of random access occasions for CSI-RS based random access procedures in accordance with aspects of the present disclosure.

FIG. 2 illustrates an example of a wireless communications system 200 that supports indexing of random access occasions for CSI-RS based random access procedures in accordance with aspects of the present disclosure. In some examples, wireless communications system 200 may implement aspects of wireless communications system 100. Techniques described with respect to wireless communications system 200 may be implemented by a base station 105-a and UE 115-a, which may be examples of corresponding devices illustrated and described with respect to FIG. 1.

In some examples, a base station 105-a and a UE 115-a may perform CSI-RS based random access procedures. In some examples, (e.g., in NR or other 5G systems) base stations 105-a and UEs 115-a may communicate via highly directional beams. In some examples, random access occasions (e.g., one or more resources allocated for random access procedures) may correspond to particular beams. Preferred beams may be identified based on reference signal transmissions (e.g., CSI-RS signaling) and UE 115-a and the base station 105-a may perform random access channel (RACH) signaling using random access occasions 210 that correspond to one or more CSI-RSs.

In some examples, base station 105-a and UE 115-a may communicate via downlink 205 and uplink 206. In some examples, base station 105-a and UE 115-a may communicate via highly directional beams. Base station 105-a may configure UE 115-a with a set of random access occasions 210 for transmitting RACH signals on uplink 206. In some examples, base station 105-a may send a downlink configuration message 215 to UE 115-d on downlink 205. The downlink configuration message 215 may include an indication of the CSI-RS resources, and one or more random access occasion indices for indexing one or more random access occasions 210. The random access occasions 21 may correspond to time-frequency resources for transmitting RACH signaling. In some examples, the random access occasions 21 may also correspond to specific beams corresponding to a CSI-RS.

A set or subset of random access occasions 210 may correspond to one or more CSI-RSs transmitted from base station 105-a. For example, the base station 105-a may indicate a set of indexed CSI-RS resources. A first CSI-RS resource (or set of resources) may correspond to a subset of random access occasions 210, a second CSI-RS resource (or set of resources) may correspond to a second subset of random access occasions 210, etc. The base station 105-a may also communicate to the UE 115-a one or more random access occasion indices for the UE 115-a, each index of the one or more random access occasion indices corresponding to one of the one or more random access occasions 210. The UE 115-a may identify one or more random access occasions 210 for performing random access procedures based on the random access occasion indices, and a random access occasion index reset time.

The random access occasion index reset time may indicate a time period after which the random occasion indices reset. If the random access occasion index reset time is not reset periodically, then the indices may be infinite across an infinite amount of time. Further, if UE 115-a wakes up after the initiation of the random access occasion index reset time, then UE 115-a may be unable to index the correct random access occasion 210 corresponding to a particular CSI-RS. If UE 115-a determines the random access occasion index reset time and receives the random access occasion indices, then UE 115-a may successfully identify the random access occasions 210 corresponding to the received CSI-RS resources. A set of N random access occasion indices may range from 0 to N-1 across the random access occasion index reset time, and then may reset at 0 upon expiration of the random access occasion index reset time. The random access occasion index reset time may be configured to allow the network to include a sufficient number of random access occasions 210 corresponding to all actually transmitted CSI-RS resources.

In some examples, the random access occasion index reset time may be a fixed time period. In one example, the fixed time period may be standardized. In another example, the network may explicitly configure the random access occasion index reset time. The network may determine the random access occasion index reset time as a function of actually transmitted CSI-RSs, such that a high number of CSI-RSs may result in a proportionally increased random access occasion index reset time and a low number of CSI-RSs may result in a proportionally decreased random access occasion index reset time.

In some examples, the random access occasion index reset time may be determined by UE 115-a based on a number of CSI-RS resources. For instance, the UE 115-a may be configured with a table identifying a relationship between a number of CSI-RS resources and random access occasion index reset times. UE 115-a may receive an indication from the base station 105-a of a number of CSI-RS resources, and may determine the random access occasion index reset time based on the table (e.g., based on a relationship between the number of CSI-RS resources and the random access occasion index reset time). In some examples, the number of CSI-RS resources may be equal to the number of CSI-RSs configured for contention free random access transmission by the UE 115-a. In some examples, the number of CSI-RS resources may be equal to the total number of CSI-RS resources associated with corresponding random access occasions 210 at base station 105-a. In some examples, UE 115-a may receive a configuration of actually transmitted synchronization signal blocks (SSBs), and the random access occasion index reset time may be based on the number of actually transmitted SSBs. In such examples, the random access occasion index reset time may be further based on an SSB random access association period. A random access occasion index reset time may be determined by setting the ratio of the random access occasion index reset time to the SSB random access association period equal to the ratio of configured CSI-RS resources to the number of actually transmitted SSBs, and rounding the resulting random access occasion index reset time to match a transmission time interval (TTI) boundary.

Aspects of the disclosure are initially described in the context of a wireless communications system. Aspects of the disclosure are further illustrated by and described with reference to resource allocation schemes, and process flows. Aspects of the disclosure are further illustrated by and described with reference to apparatus diagrams, system diagrams, and flowcharts that relate to indexing of random access occasions 210 for CSI-RS based random access procedures.

FIG. 2 illustrates an example of a resource allocation scheme 200 that supports indexing of random access occasions for CSI-RS based random access procedures in accordance with aspects of the present disclosure. In some examples, resource allocation scheme 200 may implement aspects of wireless communications system 100. Resource allocation scheme 200 may support determining a duration of a random access occasion index reset time after which random access occasion indices are reset.

In some examples, a UE 115 may be configured with a set of random access occasions 305. Random access occasions 305 may be time-frequency resources allocated for RACH transmissions. In some examples, the random access occasions 305 may correspond to time frequency/spatial resources. Each random access occasion 305 may be indexed based on frequency, beam, or a combination thereof. Each random access occasion 305 may correspond to a random access occasion index. A set of N random access occasion indices may index random access occasions 305 in increasing order of frequency resource for frequency multiplex random access occasions 305 (e.g., physical RACH (PRACH) occasions), in increasing order of time resources indexes for time multiplexed random access occasions within a TTI (e.g., one or more slots), and in increasing order of indexes for random access occasions 305. For example, random access occasion indices may increase as frequency increases, such that random access occasion index 1 corresponds to a higher frequency than random access occasion index 0, random access index 2 corresponds to a higher frequency than random access occasion index 1, and so forth. Similarly, random access occasion index 4 may correspond to a time subsequent to the time of random access occasion index 3, and random access occasion N-4 may correspond to a time that is subsequent to the time of random access occasion index 7, and so forth. The random access occasion indices may increase from 0 to N-1 during a random access occasion index reset time 310. In some cases, random access occasions 305 may also correspond to specific beams.

A base station 105 may send a configuration message, which may include an indication of one or more CSI-RS resources, and one or more random access occasion indices. For instance, the base station may provide the UE with a list of CSI-RS indices. For each CSI-RS index, the base station may provide a random access occasion list. In a non-limiting illustrative example, for a first CSI-RS, base station 105 may send random access occasion indices 2, 5, 7, and N-3, indicating four random access occasions 305 corresponding to the first CSI-RS. For a second CSI-RS, base station 105 may send random access occasion indices 0, 3, 4, and N-4, indicating four more random access occasions 305 corresponding to the second CSI-RS. UE 115 may identify the random access occasions 305 based on the received indices and a random access occasion index reset time.

Random access occasion index reset time 310 may be the time period during which the set of N random access occasion indices completely cycles. After the expiration of random access occasion index reset time 310, the random access occasion indices may reset. Thus, at a time t0, the random access occasion indices may reset, beginning with index 0 and increasing across frequency, time, and index number, through random access occasion index N-1. At time t1, the random access occasion index reset time 310 may expire, and the random access occasion indices may reset again, beginning with random access occasion index 0. Resetting the random access occasion indices every random access occasion index reset time 310 ensures that the random access occasion indices do not become infinite as time continues, and ensures that the UE 115 may be able to identify the random access occasions 305 it is allotted, even if the UE 115 wakes up during the random access occasion index reset time 310. The random access occasion index reset time 310 may be determined in a number of ways, as described in greater detail herein. In some examples, the random access occasion index reset time 310 may be rounded to a nearest TTI boundary (e.g., a slot, mini-slot, subframe, frame).

The random access occasion index reset time 310 may be configured such that the random access occasion indices reset after an amount of time that allows the network to fit in a sufficient number of random access occasions 305, corresponding to all actually transmitted CSI-RS resources within the random access occasion index reset time 310. If the random access occasion index reset time 310 is set to be equal to an SSB random access association period, the number of actually transmitted SSBs may be different from the number of actually transmitted CSI-RSs. Instead, the random access occasion index reset time 310 may a function of the total number of actually transmitted CSI-RS. In such cases if the number of actually transmitted CSI-RSs is very high, then the duration of the random access occasion index reset time 310 will increase proportionately. Similarly, if the number of actually transmitted CSI-RSs is very low, then the duration of the random access occasion index reset time 310 will decrease proportionately. CSI-RS may be configured in a UE-specific manner, such that a UE 115 may not be aware of the total number of CSI-RS resources. As such, random access occasion index reset time 310 may be determined in one of the following ways.

In some examples, the random access occasion index reset time 310 may be a fixed time period. The fixed time period may be, for example, 160 ms, 80 ms, or some other time duration. In some examples, the fixed time period may be standardized (e.g., in a 3GPP specification). In some examples, the UE 115 may be configured (e.g., via higher layer signaling) with the known fixed time period.

In some examples, the random access occasion index reset time 310 may be based on a fixed time period that is configured by the network. A base station 105 may determine the fixed time period, and may indicate it to the base station 105. In some examples, base station 105 may determine the fixed time period. The base station 105 may indicate to the UE 115 the random access occasion index reset time 310 (that is equal to the fixed time period). In some examples, the fixed time period may be configured to cover all random access occasions 305 that correspond to configured CSI-RS resources.

In some examples, the random access occasion index reset time 310 may be based on one or both of the fixed time period and a maximum random access occasion value. In some examples, a fixed time period (e.g., 160 ms) may contain a high number of CSI-RS resources. In some examples, the number of CSI-RS resources may be more than the number of random access occasions 305. In such examples, the random access occasion index reset time 310 may be based on (e.g., the minimum between) the fixed time period and a maximum random access occasion. For instance, a maximum random access occasion may be 512. In such examples, the set N of random access occasions 305 may range from 0 to 511. The random access occasion index reset time 310 may expire after random access occasion 305 511 if that occurs prior to the expiration of the fixed time period (e.g., 160 ms). Alternatively, if the fixed time period expires prior to the maximum random access occasion 305 511, then the random access occasion index reset time 310 may be equal to the fixed time period. In some examples, the random access occasion indices may reset after the maximum random access occasion 305, and may then reset again upon expiration of the fixed time period.

In some examples, the random access occasion index reset time 310 may depend on a number of UE specific configured CSI-RS resources. That is, the random access occasion index reset time 310 may be based on the number of the CSI-RSs configured for contention free random access transmission by the UE 115. A UE 115 may be configured with a number of contention free random access transmissions via, for example, higher layer signaling (e.g., RRC signaling). Without needing to receive additional information from the base station 105 regarding a total number of configured CSI-RS resources (which may correspond to other UEs 115), the UE 115 may determine the random access occasion index reset time 310 based on its own configured CSI-RS resources. The UE may be configured with information regarding the relationship between the random access occasion index reset time 310 and the number of UE-specific CSI-RSs. In some examples, a standard (e.g., a 3GPP standard) may identify the relationship between the number of configured CSI-RS resources and the random access occasion index reset time 310. The UE 115 may determine the random access occasion index reset time 310 based on the network configured CSI-RS resources for the UE 115. In some examples, the UE 115 may be configured with a table. Each entry in the table may indicate a random access occasion index reset time 310 for a number or a range of numbers of CSI-RSs. By determining the number of CSI-RSs configured for contention free random access transmission by the UE 115, the UE 115 may identify a table entry that indicates a corresponding random access occasion index reset time 310.

In some examples, random access occasion index reset time 310 may be based on a total number of configured CSI-RS resources. The network may explicitly configure a total number of CSI-RS resources that are associated with random access occasions 305. That is, random access occasion index reset time 310 may be based on the total number of CSI-RS resources configured by base station 105, instead of being based on only the CSI-RS resources configured for a single UE 115. Random access occasion index reset time 310 may identify a relationship between the total number of configured CSI-RS resources and a random access occasion index reset time 310. For example, a standard document (e.g., a 3GPP specification) may identify a relationship between the total number of configured CSI-RS resources and a random access occasion index reset time 310. In some examples, the UE 115 may be configured with a table. Each entry in the table may indicate a random access occasion index reset time 310 for a number or a range of numbers of total configured CSI-RS resources. By determining the number of total configured CSI-RS resources, the UE 115 may identify a table entry that indicates a corresponding random access occasion index reset time 310.

In some examples, random access occasion index reset time 310 may depend on a number of configured CSI-RS resources, a number of actually transmitted SSBs, and an SSB random access association period. UE 115 may receive a number of actually transmitted SSBs, and may determine a ratio between the number of actually transmitted SSBs and the number of configured CSI-RS resources. UE 115-b may then determine the random access occasion index reset time, where the ratio of the random access occasion index reset time to the SSB random access association period is equal to the ratio of the number of actually transmitted SSBs to the number of configured CSI-RS resources. The resulting calculated random access occasion index reset time 310 may be rounded up to the nearest TTI boundary so that the random access occasion index reset time has an integer TTI value. Similarly, when determining the random access occasion index reset time 310 based on a fixed time period or based on a number of UE-specific or total number of CSI-RS resources, if the random access occasion index reset time 310 is not an integer number of TTIs, UE 115 may round the determined random access occasion index reset time 310 up or down to a nearest TTI boundary.

In some examples, the random access occasion index reset time 310 may be specified as a multiple of $2^n \times$radio frame duration. By specifying the random access occasion index reset time 310, boundary issues may be avoided. That is, specifying the random access occasion index reset time 310 in this manner may ensure that a time period may also include an integer number of random access occasion index reset times 310. This may also allow a UE 115 to track the random access occasion index reset time 31 regardless of when it wakes up. In some examples, the time period may be signaled with a single value n.

Figure 3:
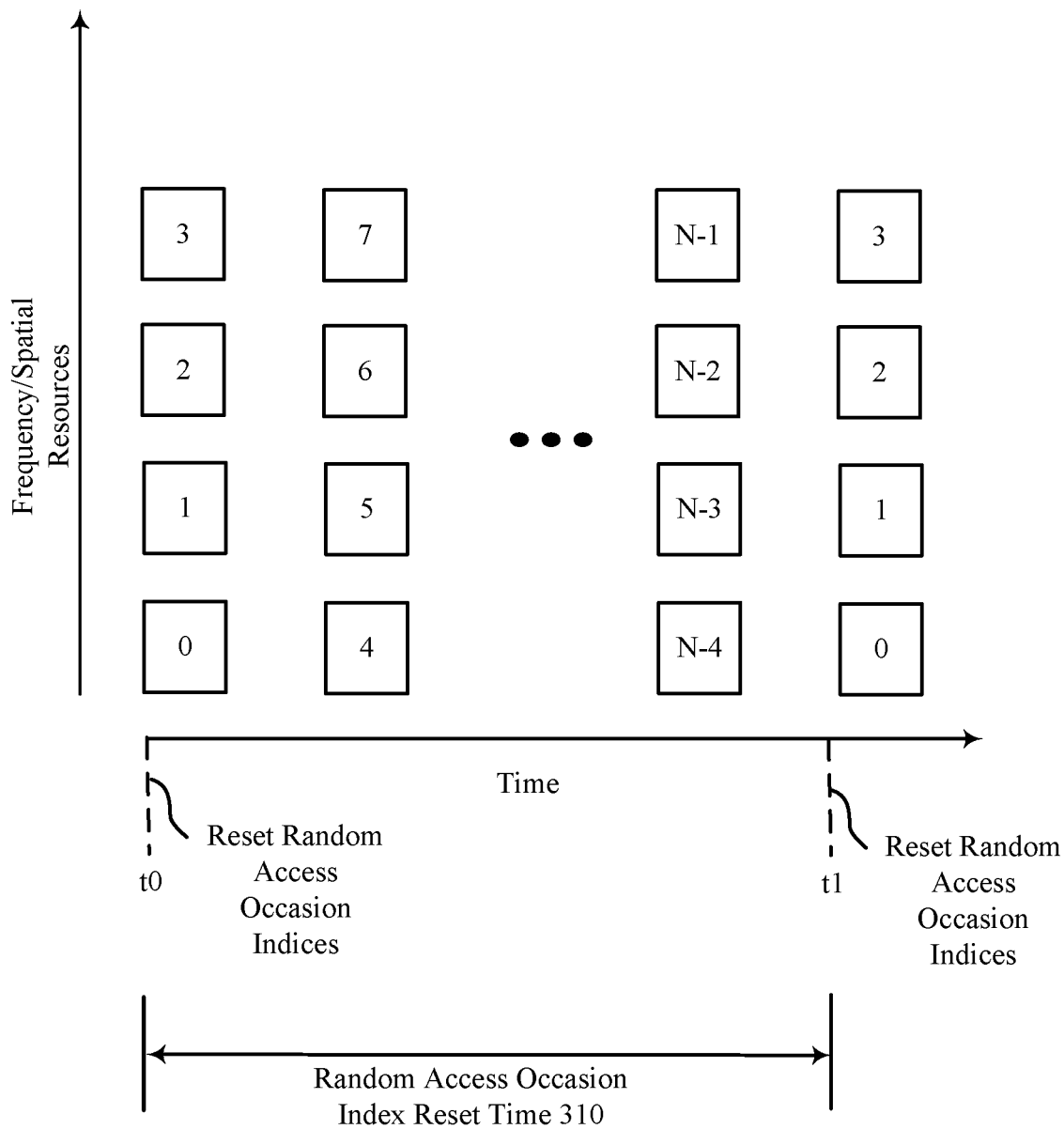
FIG. 3 illustrates an example of a resource allocation scheme that supports indexing of random access occasions for CSI-RS based random access procedures in accordance with aspects of the present disclosure.

FIG. 3 illustrates an example of a process flow 300 that supports indexing of random access occasions for CSI-RS based random access procedures in accordance with aspects of the present disclosure. In some examples, process flow 300 may implement aspects of wireless communications system 100. Techniques described with respect to process flow 300 may be implemented by a base station 105-b and a UE 115-b, which may be examples of corresponding devices illustrated and described with respect to FIG. 1 and FIG. 2.

At 405, base station 105-b may transmit a configuration message to UE 115-b. In some examples, the configuration message may be a radio resource control (RRC) message. In some examples, the configuration message may be system information, downlink control information (DCI), a media access control control element (MAC-CE), a handover report, or the like. In some examples, the configuration message may be transmitted to the UE 115-b that is operating in connected mode (e.g., via an RRC message, a MAC-CE or the like). In other examples, the configuration message may be transmitted to the UE 115-b that is operating in an idle mode.

The configuration message may include an indication of one or more CSI-RS resources. The configuration message may further include one or more random access indices for UE 115-b, indicating which random access occasions UE 115-b is to use for transmitting RACH at 425.

At 410, UE 115-b may identify random access occasions, based at least in part on the configuration message. For instance, UE 115-b may identify the random access occasions based on the CSI-RS resources and the random access occasion indices for the UE, and a random access occasion index reset time. The random access occasion index reset time may indicate a time period after which the random access occasion indices reset. In some examples, the random access occasion index reset time may be based on a fixed time period or a number of the one or more CSI-RS resources.

At 415, the base station 105-b may identify random access occasions, based at least in part on the CSI-RS resources and the random access occasion indices for the UE, and a random access occasion index reset time. Base station 105-b and UE 115-b may perform RACH procedures at 425 based on identifying the random access occasions at 410 and 415.

In some examples, the random access occasion index reset time may be based on a fixed time period. UE 115-b may receive from base station 105-b an indication of the fixed time period. The indication may be included in a configuration message sent at 405, or another downlink message. In some examples, the random access occasion index reset time may be equal to the fixed time period in the indication. The fixed time period may be standardized (e.g., included in a standard specification such as a 3GPP specification) and known at the base station 105-b and the UE 115-b. In some examples, a network device may configure the random access occasion index reset time to include sufficient random access occasions associated with UE 115-b.

In some examples, the random access occasion index reset time may be based on a number of CSI-RS resources. In one example, the number of one or more CSI-RS resources may be UE-specific. For instance, the number of CSI-RS resources may be equal to a number of CSI-RS signals configured for contention free random access transmissions by UE 115-b. In some examples, the number of one or more CSI-RS resources may be based on a total number of configured CSI-RS resources by the base station 105-b. For instance, the number of one or more CSI-RS resources may be the total number of CSI-RS resources associated with corresponding random access occasions at base station 105-b.

In some examples, UE 115-b may receive one or more SSBs from base station 105-b. UE 115-b may determine the random access occasion index reset time based at least in part on the number of actually transmitted SSBs. For instance, UE 115-b may determine a ratio between the number of actually transmitted SSBs and the number of configured CSI-RS resources. UE 115-b may then determine the random access occasion index reset time, where the ratio of the random access occasion index reset time to the SSB random access association period is equal to the ratio of the number of actually transmitted SSBs to the number of configured CSI-RS resources. The resulting calculated random access occasion index reset time may be rounded up to the nearest TTI boundary so that the random access occasion index reset time has an integer TTI value.

At 420, base station 105-b may transmit one or more CSI-RSs on one or more CSI-RS resources. UE 115-b may receive the CSI-RSs. At 425, UE 115-b may transmit one or more RACH signals on the identified random access occasions, based on the random access occasion indices and the CSI-RS resources, and the random access occasion index reset time.

Figure 4:
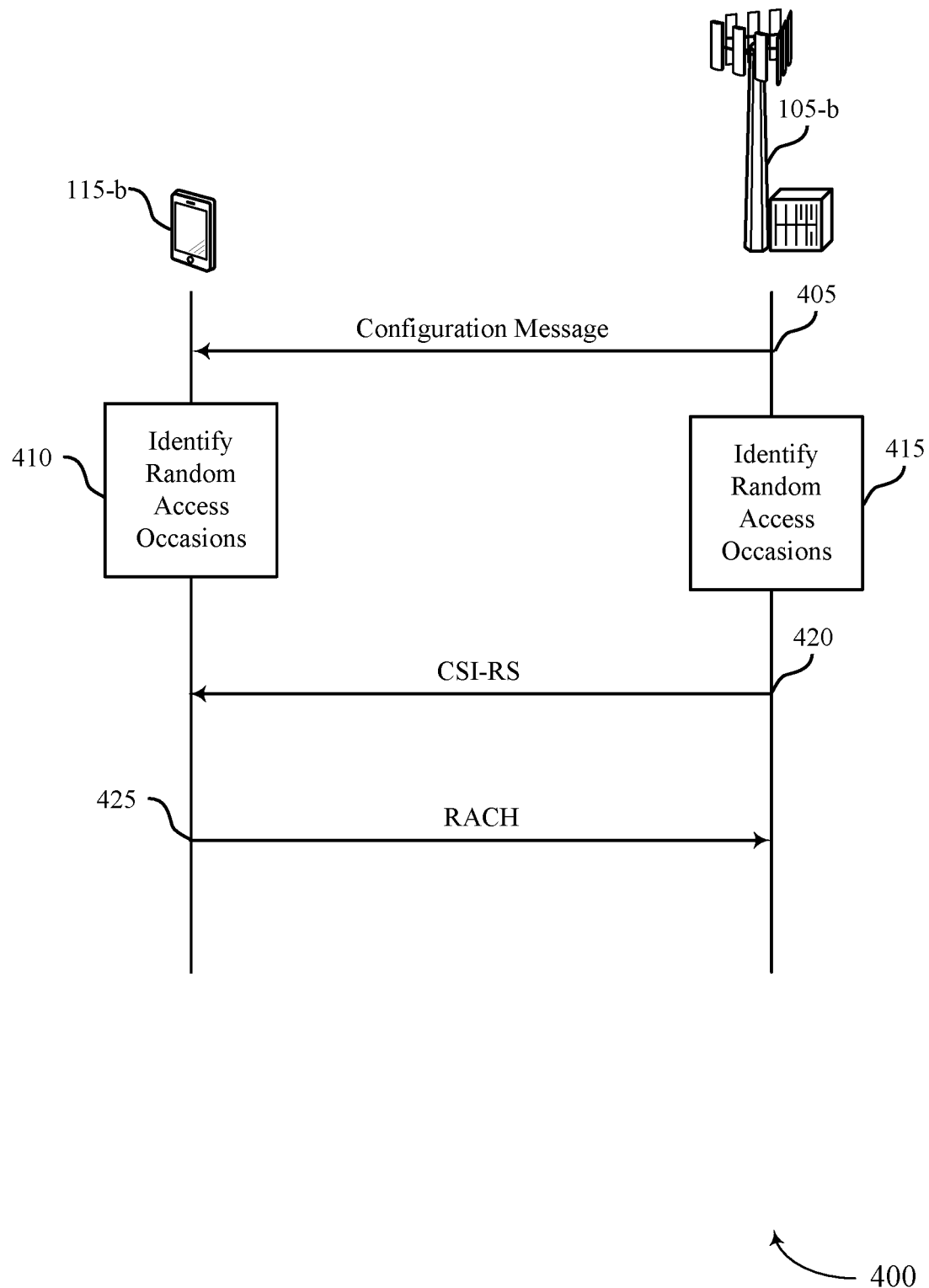
FIG. 4 illustrates an example of a process flow that supports indexing of random access occasions for CSI-RS based random access procedures in accordance with aspects of the present disclosure.

FIG. 4 shows a block diagram 400 of a device 405 that supports indexing of random access occasions for CSI-RS based random access procedures in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to indexing of random access occasions for CSI-RS based random access procedures, etc.). Information may be passed on to other components of the device 405. The receiver 410 may be an example of aspects of the transceiver 820 described with reference to FIG. 8. The receiver 410 may utilize a single antenna or a set of antennas.

The communications manager 415 may receive, from a base station, a configuration message including an indication of one or more CSI-RS resources, and one or more random access occasion indices for the UE, identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources, and perform a random access procedure with the base station according to the identified one or more random access occasions. The communications manager 415 may be an example of aspects of the communications manager 810 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processing (DSP), an application-specific integrated circuit (ASIC), a Field-Programmable Gate Array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 820 described with reference to FIG. 8. The transmitter 420 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to determine the random access occasion index reset time and receive the random access occasion indices corresponding to the received CSI-RS resources. The device 505 may performing random access procedures based on the random access occasion indices, and a random access occasion index reset time. Resetting the random access occasion indices may increase reliability and reduce latency during transmissions.

Based on techniques for resetting the random access occasion indices as described herein, a processor of a UE 115 (e.g., controlling the receiver 510, the transmitter 520, or the transceiver 820 as described with reference to FIG. 8) may increase reliability and decrease signaling overhead.

Figure 5:
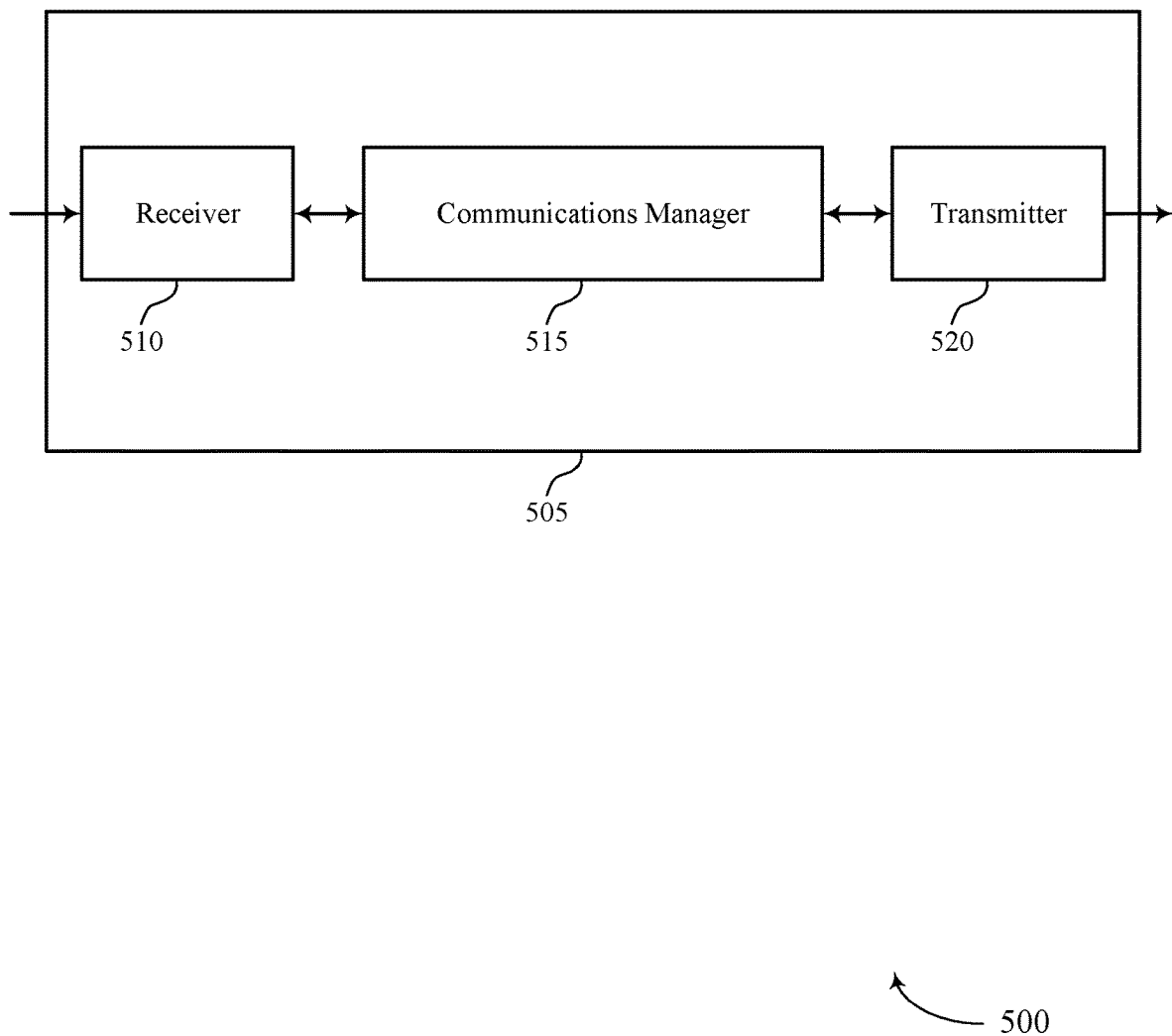
FIGS. 5 and 6 show block diagrams of devices that support indexing of random access occasions for CSI-RS based random access procedures in accordance with aspects of the present disclosure.

FIG. 5 shows a block diagram 500 of a device 505 that supports indexing of random access occasions for CSI-RS based random access procedures in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to indexing of random access occasions for CSI-RS based random access procedures, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may be an example of aspects of the communications manager 415 as described herein. The communications manager 515 may include a configuration message manager 520, a random access occasion manager 525, and a random access procedure manager 530. The communications manager 515 may be an example of aspects of the communications manager 810 described herein.

The configuration message manager 520 may receive, from a base station, a configuration message including an indication of one or more CSI-RS resources, and one or more random access occasion indices for the UE.

The random access occasion manager 525 may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources.

The random access procedure manager 530 may perform a random access procedure with the base station according to the identified one or more random access occasions.

The transmitter 535 may transmit signals generated by other components of the device 505. In some examples, the transmitter 535 may be collocated with a receiver 510 in a transceiver module. For example, the transmitter 535 may be an example of aspects of the transceiver 820 described with reference to FIG. 8. The transmitter 535 may utilize a single antenna or a set of antennas.

In some examples, the communications manager 615 may be implemented as an integrated circuit or chipset for a mobile device modem, and the receiver 610 and transmitter 635 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to determine the random access occasion index reset time and receive the random access occasion indices corresponding to the received CSI-RS resources. The device 605 may performing random access procedures based on the random access occasion indices, and a random access occasion index reset time. Resetting the random access occasion indices may increase reliability and reduce latency during transmissions.

Based on techniques for resetting the random access occasion indices as described herein, a processor of a UE 115 (e.g., controlling the receiver 610, the transmitter 635, or the transceiver 820 as described with reference to FIG. 8) may increase reliability and decrease signaling overhead.

Figure 6:
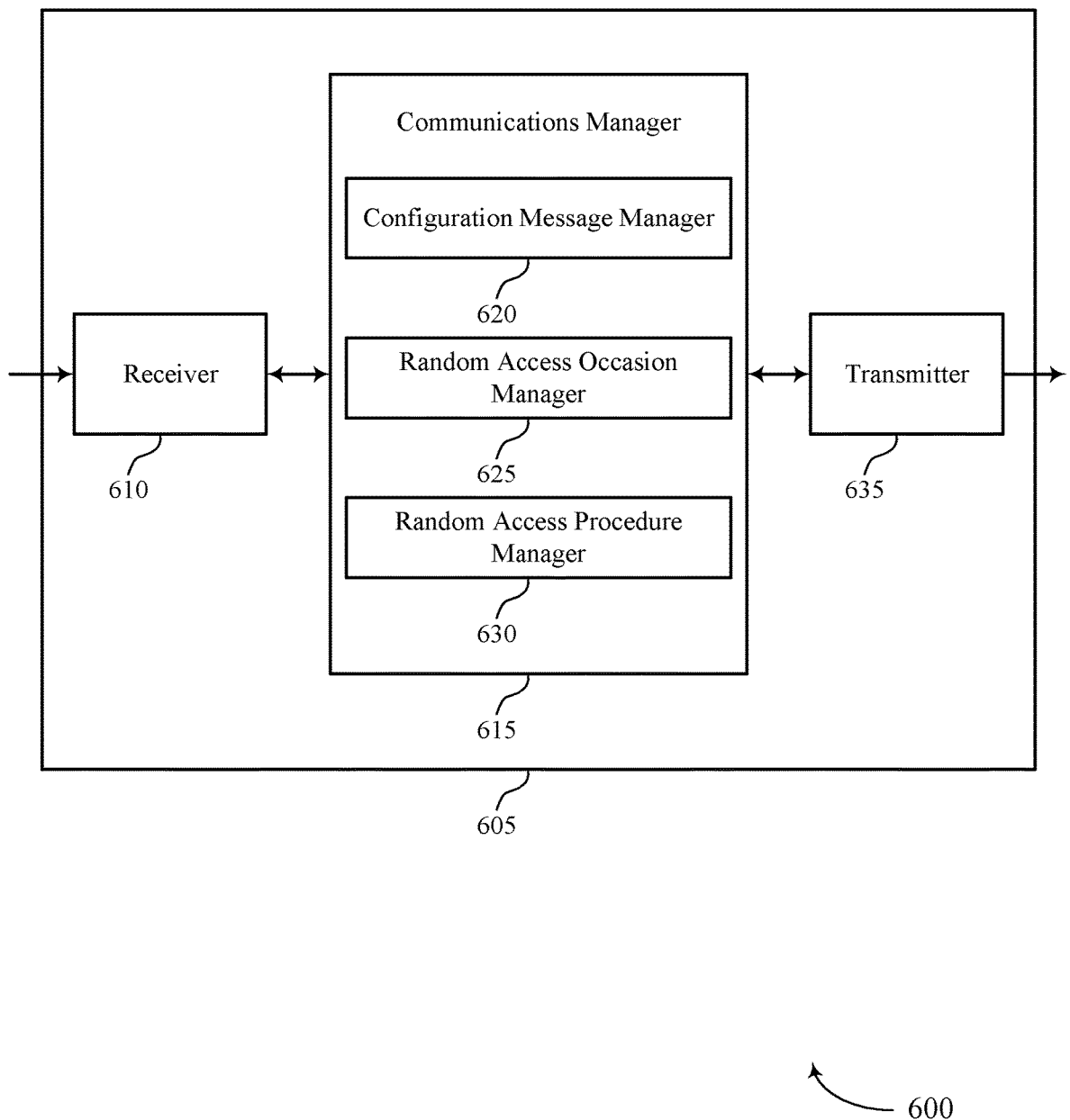

FIG. 6 shows a block diagram 600 of a communications manager 605 that supports indexing of random access occasions for CSI-RS based random access procedures in accordance with aspects of the present disclosure. The communications manager 605 may be an example of aspects of a communications manager 415, a communications manager 515, or a communications manager 810 described herein. The communications manager 605 may include a configuration message manager 610, a random access occasion manager 615, a random access procedure manager 620, a fixed time period manager 625, a CSI-RS resource manager 630, and a SSB manager 635. Each of these modules may communicate, directly or indirectly, with one another (e.g., via one or more buses).

The configuration message manager 610 may receive, from a base station, a configuration message including an indication of one or more CSI-RS resources, and one or more random access occasion indices for the UE.

The random access occasion manager 615 may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources.

The random access procedure manager 620 may perform a random access procedure with the base station according to the identified one or more random access occasions.

The fixed time period manager 625 may receive an indication of the fixed time period from the base station, where the random access occasion index reset time is equal to the fixed time period. In some cases, the fixed time period includes the one or more random access occasions associated with the UE.

In some cases, the indication is received in system information, downlink control information, a media access control control element (MAC-CE), a RRC signal, a handover report, or any combination thereof. In some cases, the fixed time period is standardized. In some cases, the random access occasion index reset time is based at least in part on a maximum random access occasion The CSI-RS resource manager 630 may receive an indication of the number of the one or more CSI-RS resources from the base station. In some cases, the number of the one or more CSI-RS resources is equal to a number of CSI-RSs configured for contention free random access transmission by the UE. In some cases, the number of the one or more CSI-RS resources is a total number of CSI-RS resources associated with corresponding random access occasions at the base station.

The SSB manager 635 may receive a configuration of a number of actually transmitted synchronization signal blocks (SSBs), where the random access occasion index reset time is based on the number of actually transmitted SSBs.

Figure 7:
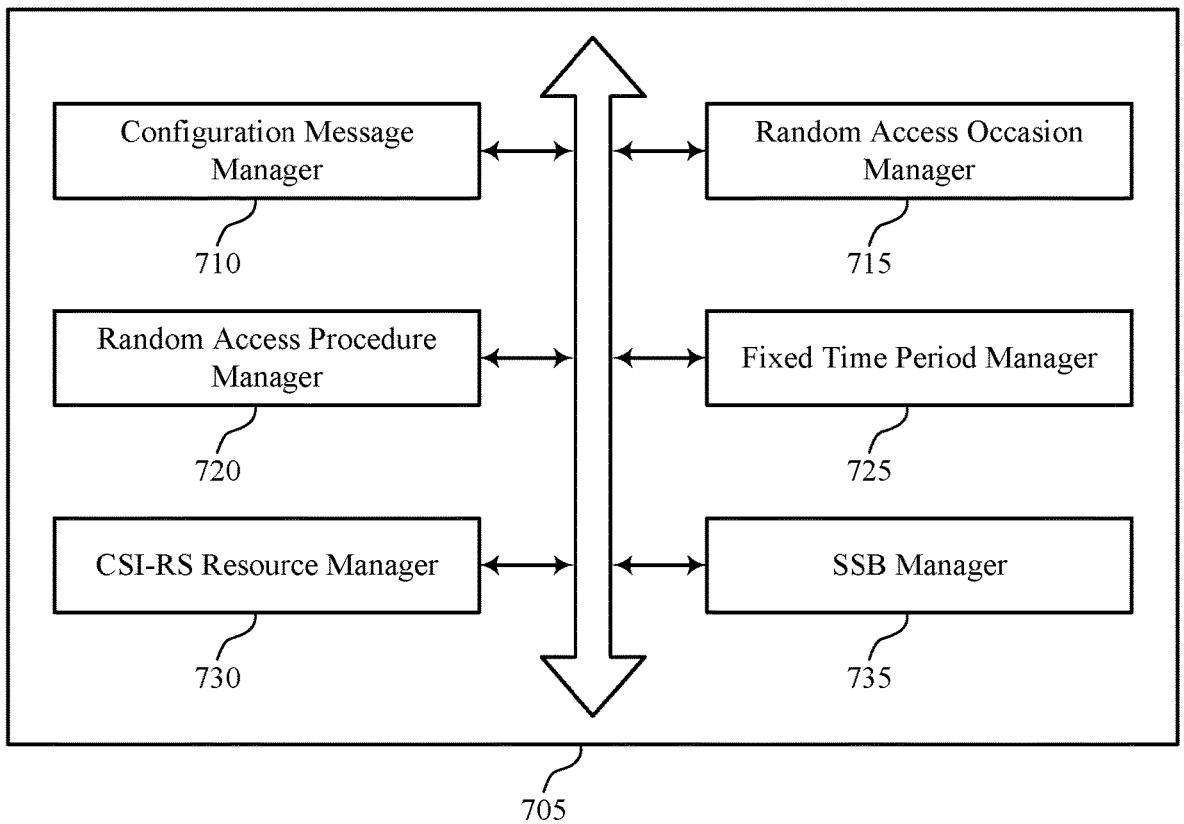
FIG. 7 shows a block diagram of a communications manager that supports indexing of random access occasions for CSI-RS based random access procedures in accordance with aspects of the present disclosure.

FIG. 7 shows a diagram of a system 700 including a device 705 that supports indexing of random access occasions for CSI-RS based random access procedures in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, a configuration message including an indication of one or more CSI-RS resources, and one or more random access occasion indices for the UE, identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources, and perform a random access procedure with the base station according to the identified one or more random access occasions.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting indexing of random access occasions for CSI-RS based random access procedures).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
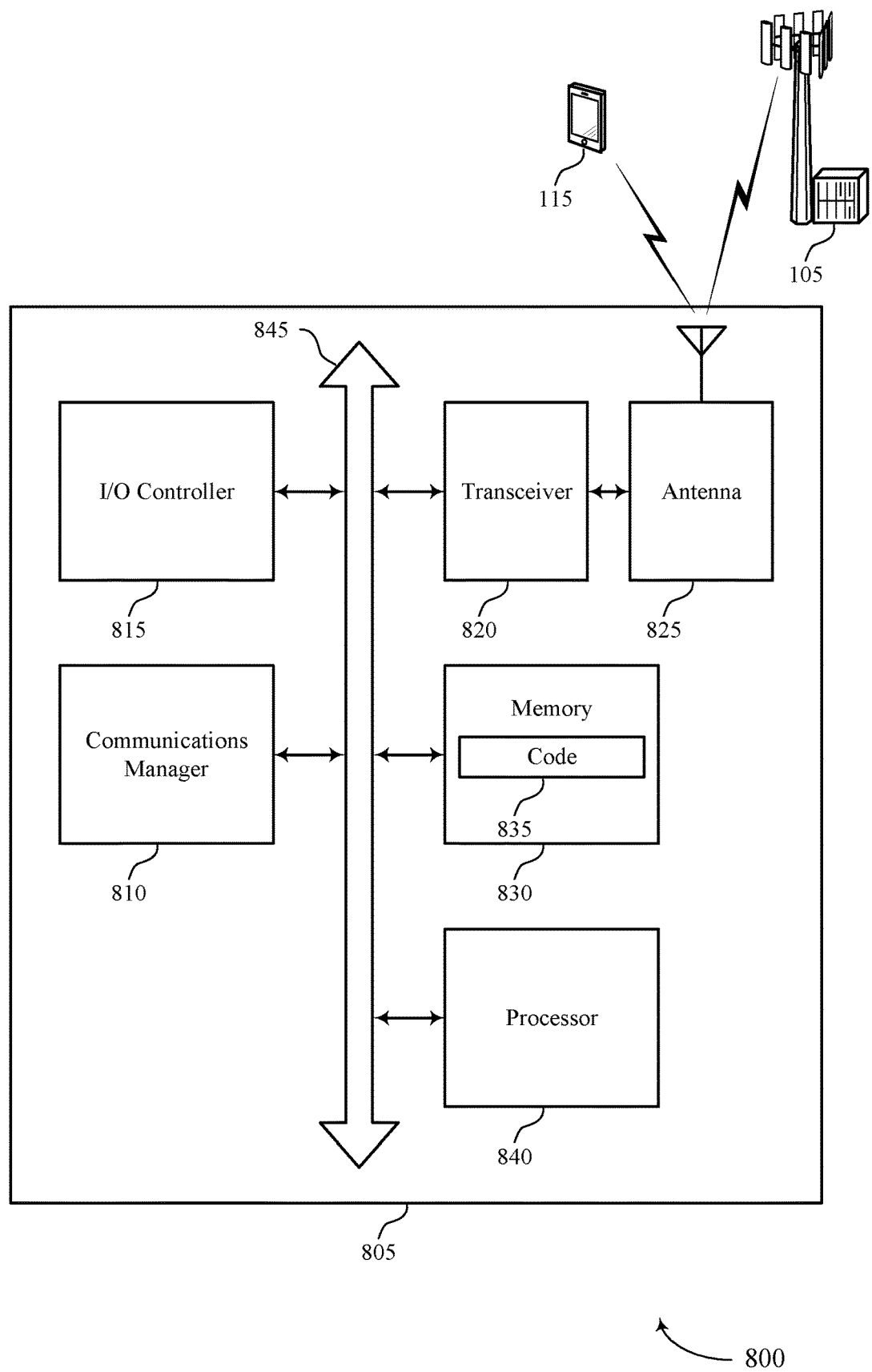
FIG. 8 shows a diagram of a system including a device that supports indexing of random access occasions for CSI-RS based random access procedures in accordance with aspects of the present disclosure.

FIG. 8 shows a block diagram 800 of a device 805 that supports indexing of random access occasions for CSI-RS based random access procedures in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to indexing of random access occasions for CSI-RS based random access procedures, etc.). Information may be passed on to other components of the device 805. The receiver 810 may be an example of aspects of the transceiver 1220 described with reference to FIG. 12. The receiver 810 may utilize a single antenna or a set of antennas.

The communications manager 815 may transmit, to a UE, a configuration message including an indication of one or more CSI-RS resources for the UE, and one or more random access occasion indices for the UE, identify one or more random access occasions associated with the UE based on the CSI-RS resources for the UE, the random access occasion indices for the UE, and a random access occasion index reset time, where the random access occasion index reset time is based on one or more of: a fixed time period or a number of the one or more CSI-RS resources assigned to the UE, and perform a random access procedure with the UE according to the identified one or more random access occasions. The communications manager 815 may be an example of aspects of the communications manager 1210 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1220 described with reference to FIG. 12. The transmitter 820 may utilize a single antenna or a set of antennas.

Figure 9:
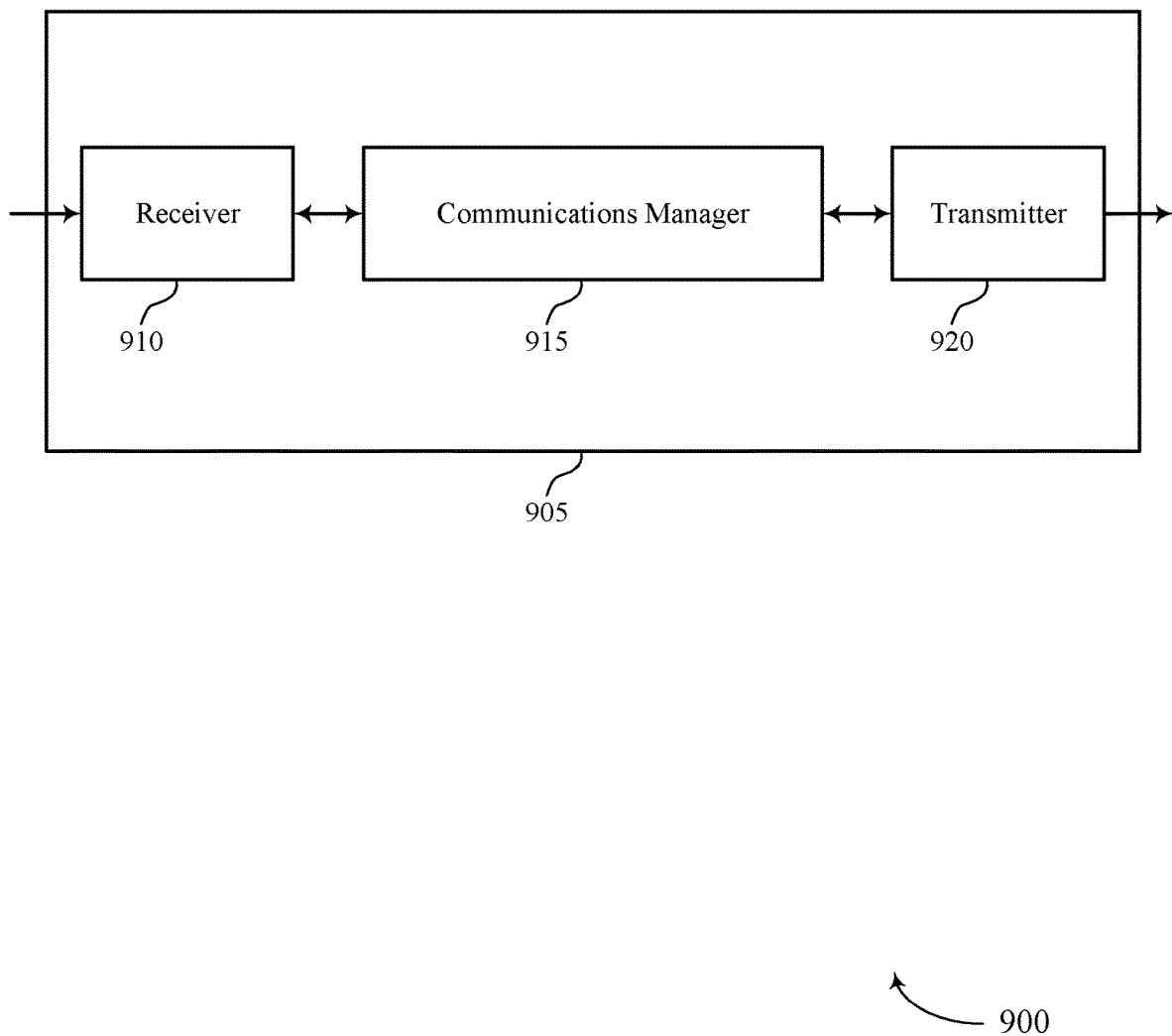
FIGS. 9 and 10 show block diagrams of devices that support indexing of random access occasions for CSI-RS based random access procedures in accordance with aspects of the present disclosure.

FIG. 9 shows a block diagram 900 of a device 905 that supports indexing of random access occasions for CSI-RS based random access procedures in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to indexing of random access occasions for CSI-RS based random access procedures, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be an example of aspects of the communications manager 815 as described herein. The communications manager 915 may include a configuration message manager 920, a random access occasion manager 925, and a random access procedure manager 930. The communications manager 915 may be an example of aspects of the communications manager 1210 described herein.

The configuration message manager 920 may transmit, to a UE, a configuration message including an indication of one or more CSI-RS resources for the UE, and one or more random access occasion indices for the UE.

The random access occasion manager 925 may identify one or more random access occasions associated with the UE based on the CSI-RS resources for the UE, the random access occasion indices for the UE, and a random access occasion index reset time, where the random access occasion index reset time is based on one or more of: a fixed time period or a number of the one or more CSI-RS resources assigned to the UE.

The random access procedure manager 930 may perform a random access procedure with the UE according to the identified one or more random access occasions.

The transmitter 935 may transmit signals generated by other components of the device 905. In some examples, the transmitter 935 may be collocated with a receiver 910 in a transceiver module. For example, the transmitter 935 may be an example of aspects of the transceiver 1220 described with reference to FIG. 12. The transmitter 935 may utilize a single antenna or a set of antennas.

Figure 10:
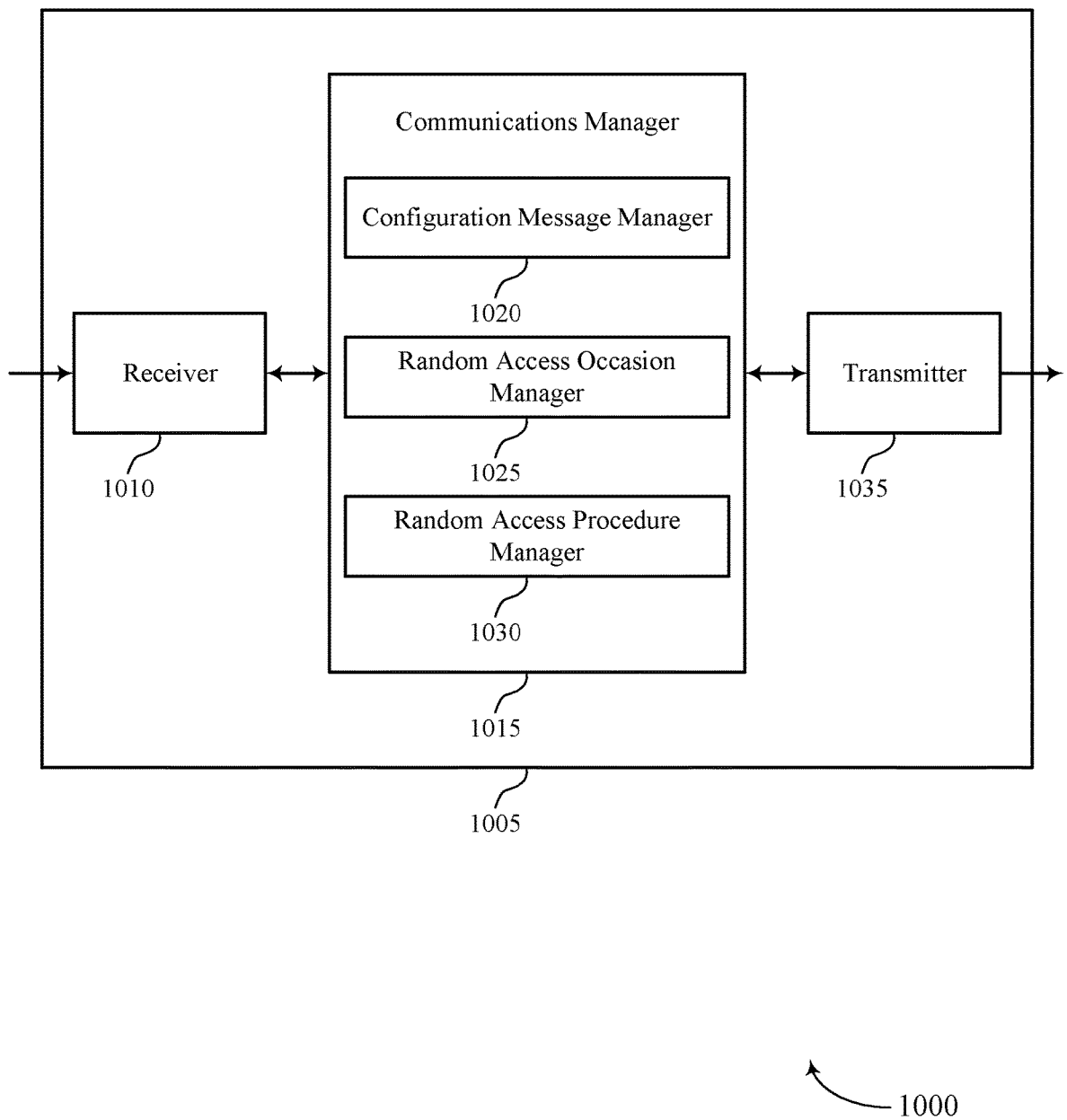

FIG. 10 shows a block diagram 1000 of a communications manager 1005 that supports indexing of random access occasions for CSI-RS based random access procedures in accordance with aspects of the present disclosure. The communications manager 1005 may be an example of aspects of a communications manager 815, a communications manager 915, or a communications manager 1210 described herein. The communications manager 1005 may include a configuration message manager 1010, a random access occasion manager 1015, a random access procedure manager 1020, a fixed time period manager 1025, a CSI-RS resource manager 1030, and a SSB manager 1035. Each of these modules may communicate, directly or indirectly, with one another (e.g., via one or more buses).

The configuration message manager 1010 may transmit, to a UE, a configuration message including an indication of one or more CSI-RS resources for the UE, and one or more random access occasion indices for the UE.

The random access occasion manager 1015 may identify one or more random access occasions associated with the UE based on the CSI-RS resources for the UE, the random access occasion indices for the UE, and a random access occasion index reset time, where the random access occasion index reset time is based on one or more of: a fixed time period or a number of the one or more CSI-RS resources assigned to the UE.

The random access procedure manager 1020 may perform a random access procedure with the UE according to the identified one or more random access occasions.

The fixed time period manager 1025 may transmit an indication of the fixed time period to the UE, where the random access occasion index reset time is equal to the fixed time period. In some cases, the fixed time period includes the one or more random access occasions associated with the UE. In some cases, the indication is transmitted in system information, downlink control information, a media access control control element (MAC-CE), a RRC signal, a handover report, or any combination thereof. In some cases, the fixed time period is standardized. In some cases, the random access occasion index reset time is based at least in part on a maximum random access occasion.

The CSI-RS resource manager 1030 may transmit an indication of the number of the one or more CSI-RS resources to the UE.

In some cases, the number of the one or more CSI-RS resources is equal to a number of CSI-RSs configured for contention free random access transmission by the UE.

In some cases, the number of the one or more CSI-RS resources is a total number of CSI-RS resources associated with corresponding random access occasions at the base station.

The SSB manager 1035 may transmit a configuration of a number of actually transmitted synchronization signal blocks (SSBs), where the random access occasion index reset time is based on the number of actually transmitted SSBs.

Figure 11:
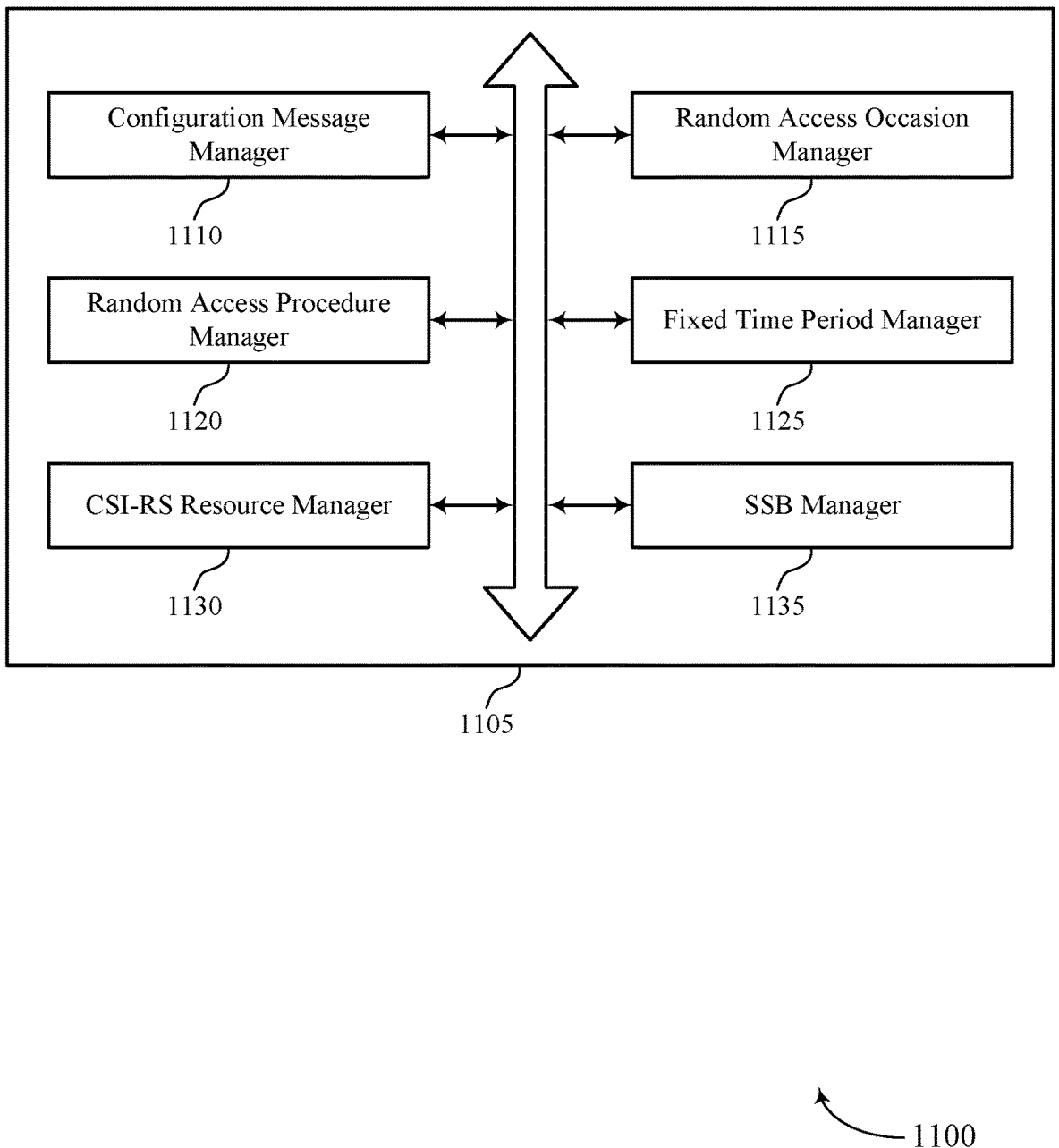
FIG. 11 shows a block diagram of a communications manager that supports indexing of random access occasions for CSI-RS based random access procedures in accordance with aspects of the present disclosure.

FIG. 11 shows a diagram of a system 1100 including a device 1105 that supports indexing of random access occasions for CSI-RS based random access procedures in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a configuration message including an indication of one or more CSI-RS resources for the UE, and one or more random access occasion indices for the UE, identify one or more random access occasions associated with the UE based on the CSI-RS resources for the UE, the random access occasion indices for the UE, and a random access occasion index reset time, where the random access occasion index reset time is based on one or more of: a fixed time period or a number of the one or more CSI-RS resources assigned to the UE, and perform a random access procedure with the UE according to the identified one or more random access occasions.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting indexing of random access occasions for CSI-RS based random access procedures).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
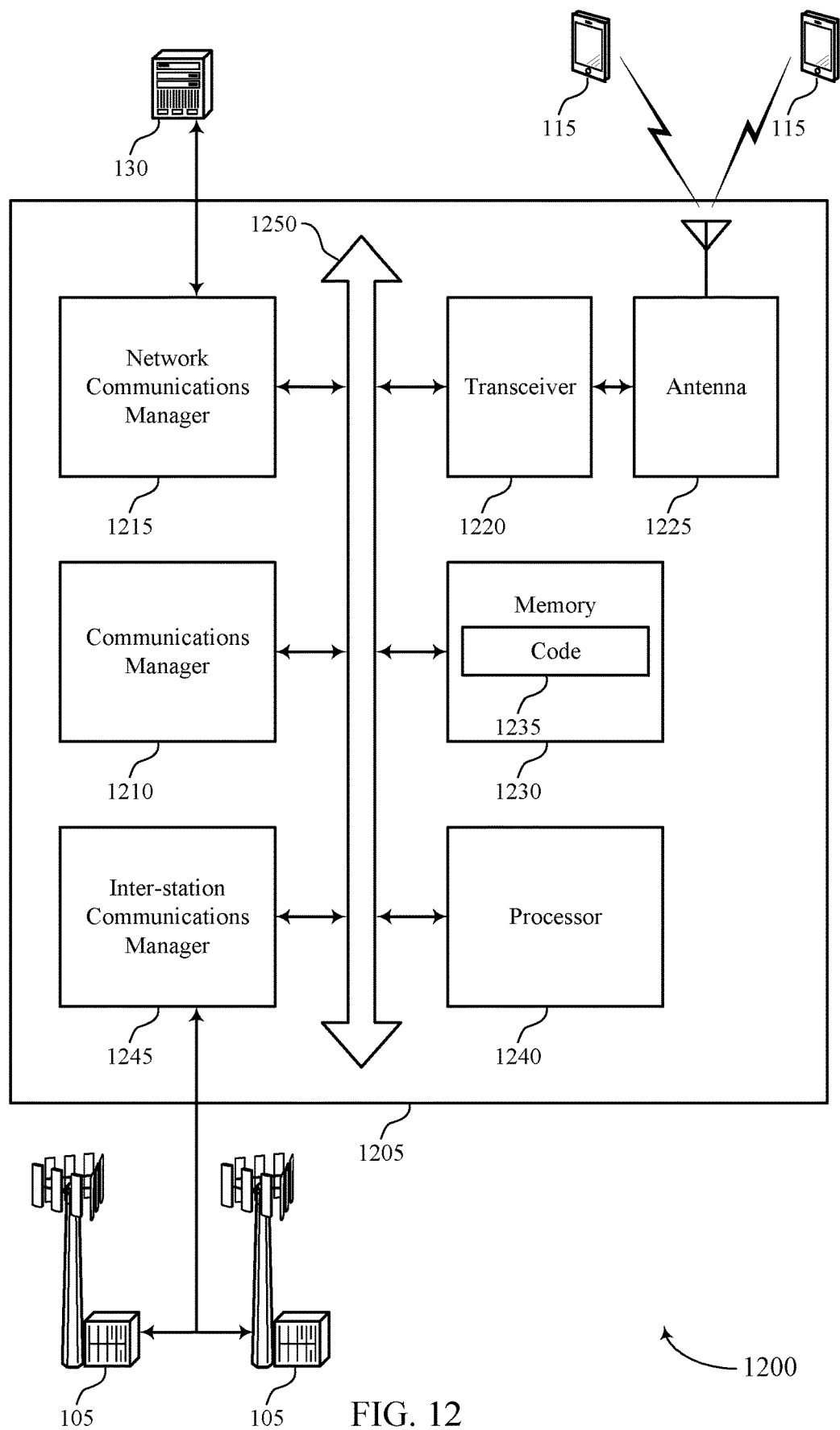
FIG. 12 shows a diagram of a system including a device that supports indexing of random access occasions for CSI-RS based random access procedures in accordance with aspects of the present disclosure.

FIG. 12 shows a flowchart illustrating a method 1200 that supports indexing of random access occasions for CSI-RS based random access procedures in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive, from a base station, a configuration message including an indication of one or more CSI-RS resources, and one or more random access occasion indices for the UE. The operations of 1205 may be performed according to the methods described herein. In some examples, aspects of the operations of 1205 may be performed by a configuration message manager as described with reference to FIGS. 4 through 7.

At 1210, the UE may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources. The operations of 1210 may be performed according to the methods described herein. In some examples, aspects of the operations of 1210 may be performed by a random access occasion manager as described with reference to FIGS. 4 through 7.

At 1215, the UE may perform a random access procedure with the base station according to the identified one or more random access occasions. The operations of 1215 may be performed according to the methods described herein. In some examples, aspects of the operations of 1215 may be performed by a random access procedure manager as described with reference to FIGS. 4 through 7.

Figure 13:
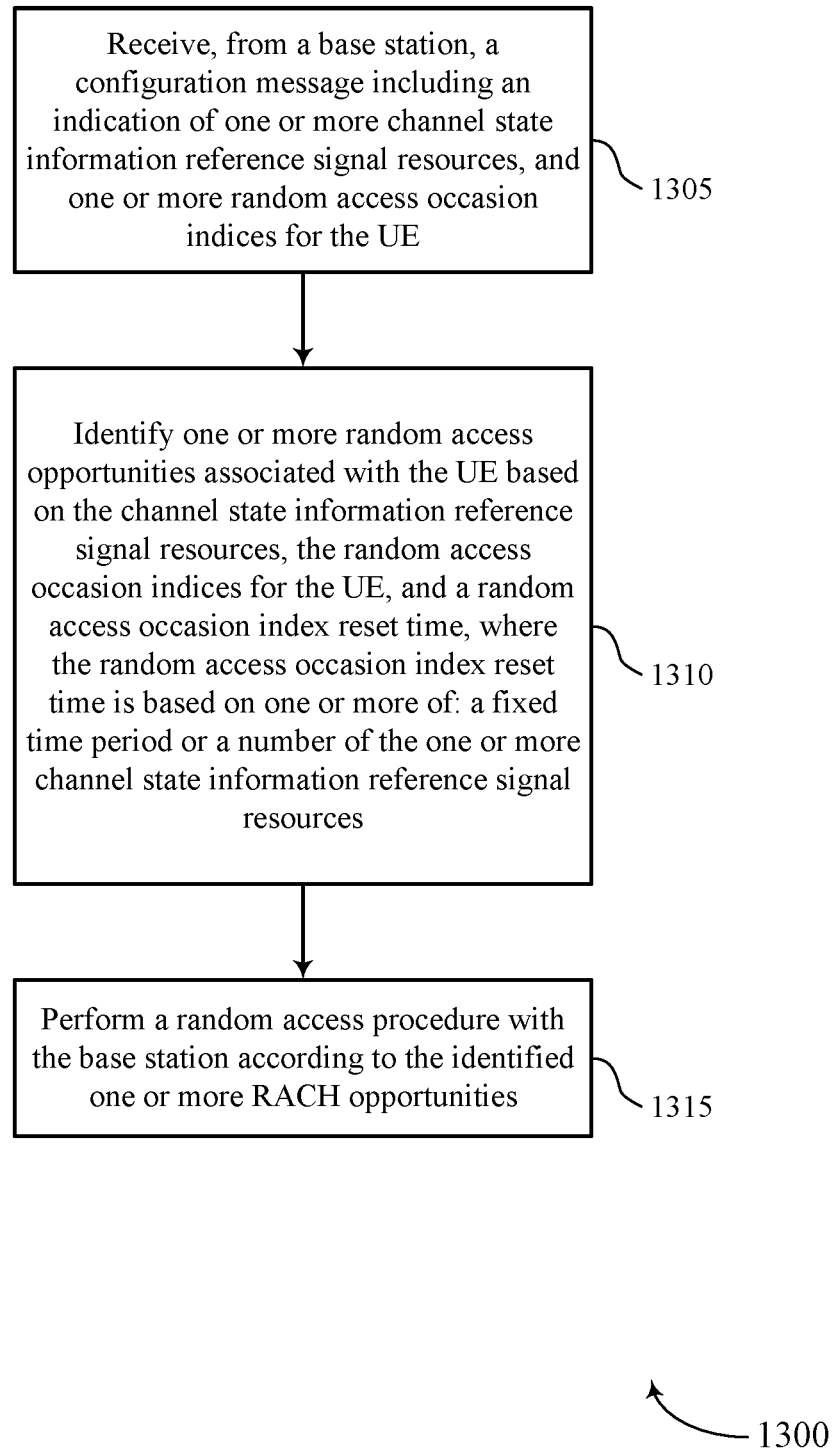
FIGS. 13 through 17 show flowcharts illustrating methods that support indexing of random access occasions for CSI-RS based random access procedures in accordance with aspects of the present disclosure.

FIG. 13 shows a flowchart illustrating a method 1300 that supports indexing of random access occasions for CSI-RS based random access procedures in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a configuration message including an indication of one or more CSI-RS resources, and one or more random access occasion indices for the UE. The operations of 1305 may be performed according to the methods described herein. In some examples, aspects of the operations of 1305 may be performed by a configuration message manager as described with reference to FIGS. 4 through 7.

At 1310, the UE may receive an indication of the fixed time period from the base station, where the random access occasion index reset time is equal to the fixed time period. The operations of 1310 may be performed according to the methods described herein. In some examples, aspects of the operations of 1310 may be performed by a fixed time period manager as described with reference to FIGS. 4 through 7.

At 1315, the UE may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources. The operations of 1315 may be performed according to the methods described herein. In some examples, aspects of the operations of 1315 may be performed by a random access occasion manager as described with reference to FIGS. 4 through 7.

At 1320, the UE may perform a random access procedure with the base station according to the identified one or more random access occasions. The operations of 1320 may be performed according to the methods described herein. In some examples, aspects of the operations of 1320 may be performed by a random access procedure manager as described with reference to FIGS. 4 through 7.

Figure 14:
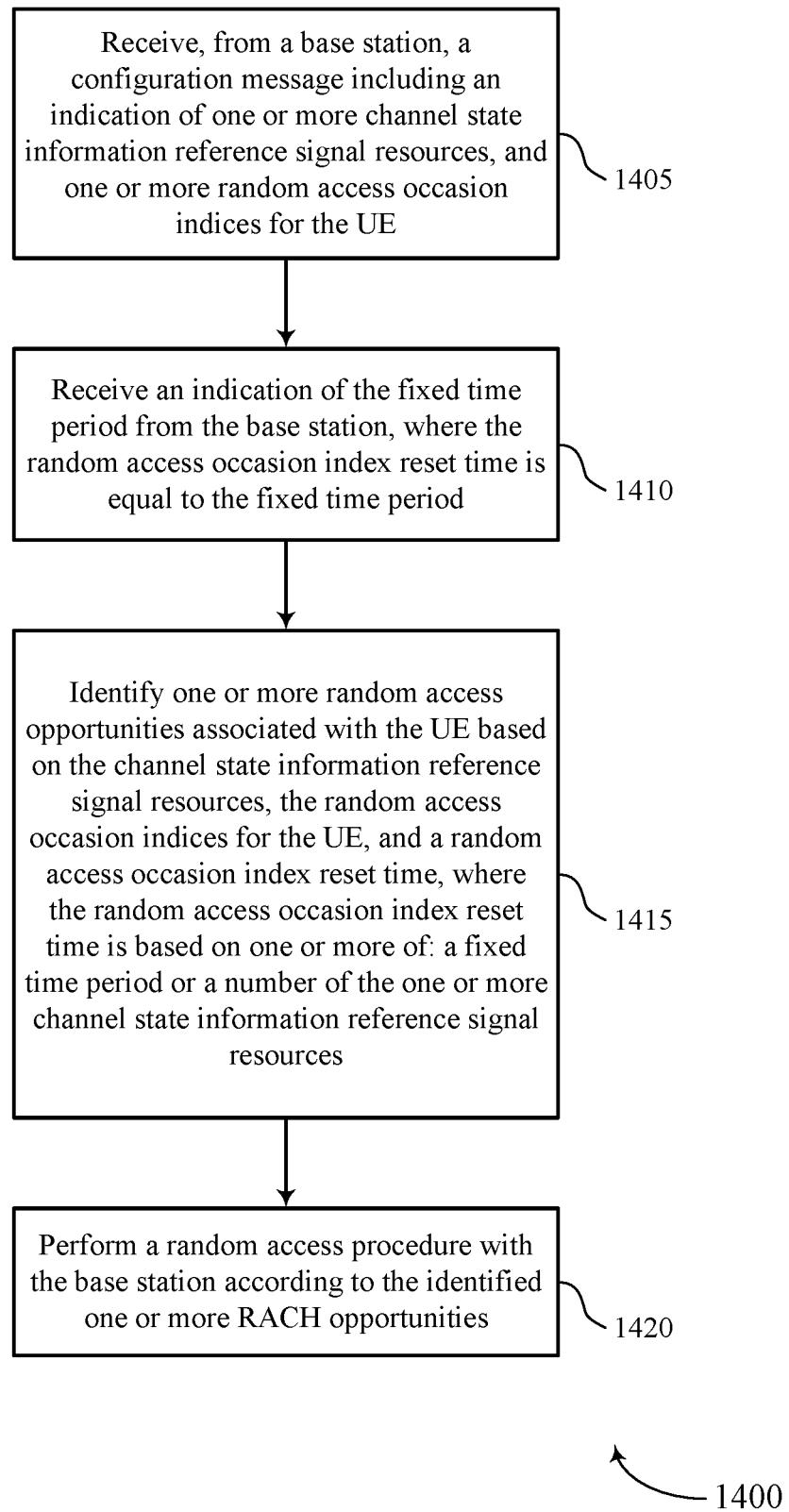

FIG. 14 shows a flowchart illustrating a method 1400 that supports indexing of random access occasions for CSI-RS based random access procedures in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a configuration message including an indication of one or more CSI-RS resources, and one or more random access occasion indices for the UE. The operations of 1405 may be performed according to the methods described herein. In some examples, aspects of the operations of 1405 may be performed by a configuration message manager as described with reference to FIGS. 4 through 7.

At 1410, the UE may receive an indication of the number of the one or more CSI-RS resources from the base station. The operations of 1410 may be performed according to the methods described herein. In some examples, aspects of the operations of 1410 may be performed by a CSI-RS resource manager as described with reference to FIGS. 4 through 7.

At 1415, the UE may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources. The operations of 1415 may be performed according to the methods described herein. In some examples, aspects of the operations of 1415 may be performed by a random access occasion manager as described with reference to FIGS. 4 through 7.

At 1420, the UE may perform a random access procedure with the base station according to the identified one or more random access occasions. The operations of 1420 may be performed according to the methods described herein. In some examples, aspects of the operations of 1420 may be performed by a random access procedure manager as described with reference to FIGS. 4 through 7.

Figure 15:
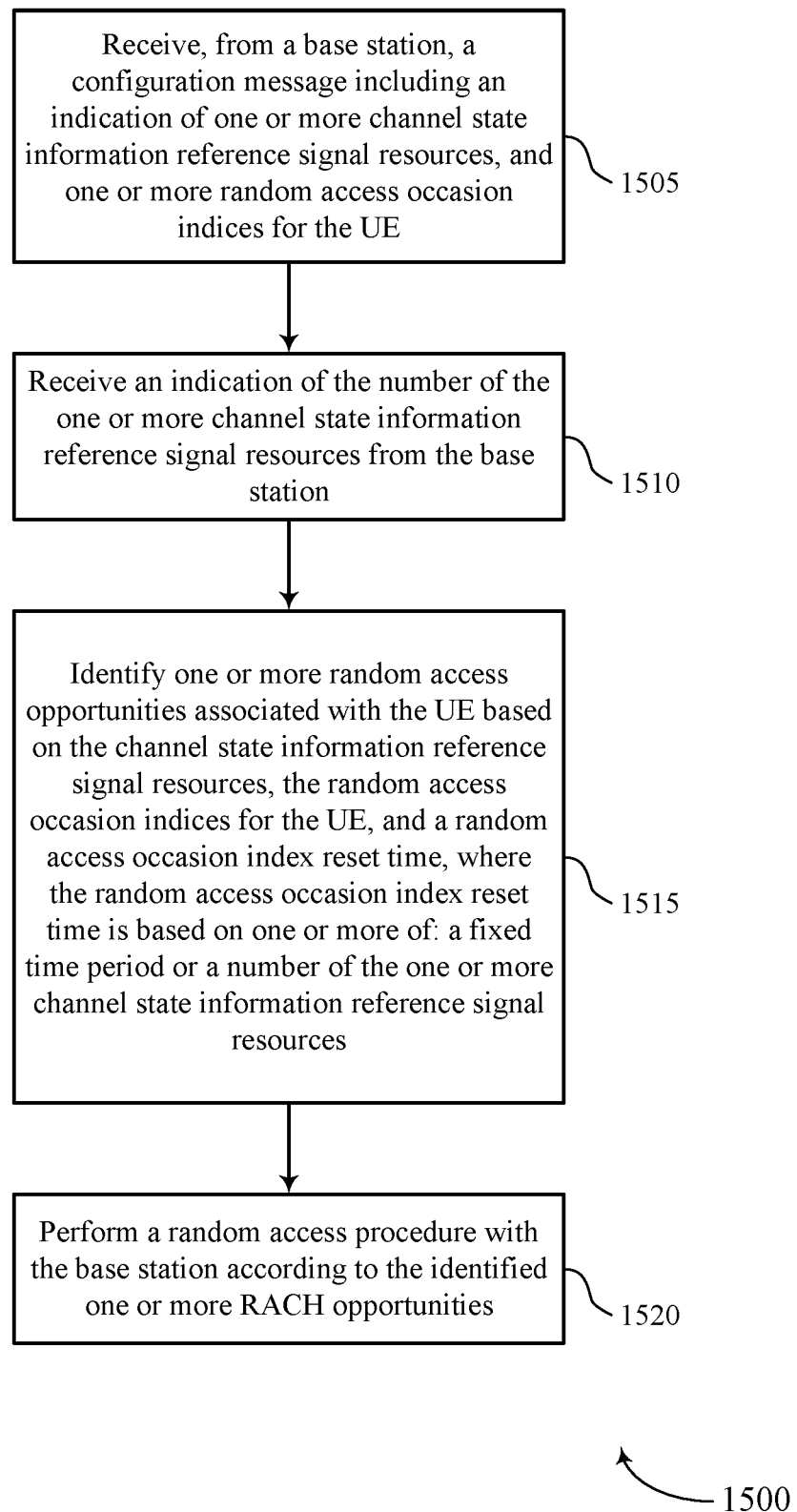

FIG. 15 shows a flowchart illustrating a method 1500 that supports indexing of random access occasions for CSI-RS based random access procedures in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration message including an indication of one or more CSI-RS resources, and one or more random access occasion indices for the UE. The operations of 1505 may be performed according to the methods described herein. In some examples, aspects of the operations of 1505 may be performed by a configuration message manager as described with reference to FIGS. 4 through 7.

At 1510, the UE may receive a configuration of a number of actually transmitted synchronization signal blocks (SSBs), where the random access occasion index reset time is based on the number of actually transmitted SSBs. The operations of 1510 may be performed according to the methods described herein. In some examples, aspects of the operations of 1510 may be performed by a SSB manager as described with reference to FIGS. 4 through 7.

At 1515, the UE may identify one or more random access occasions associated with the UE based on the CSI-RS resources, the random access occasion indices for the UE, and a random access occasion index reset time, where the random access occasion index reset time is based on one or more of: a fixed time period or a number of the one or more CSI-RS resources. The operations of 1515 may be performed according to the methods described herein. In some examples, aspects of the operations of 1515 may be performed by a random access occasion manager as described with reference to FIGS. 4 through 7.

At 1520, the UE may perform a random access procedure with the base station according to the identified one or more random access occasions. The operations of 1520 may be performed according to the methods described herein. In some examples, aspects of the operations of 1520 may be performed by a random access procedure manager as described with reference to FIGS. 4 through 7.

Figure 16:
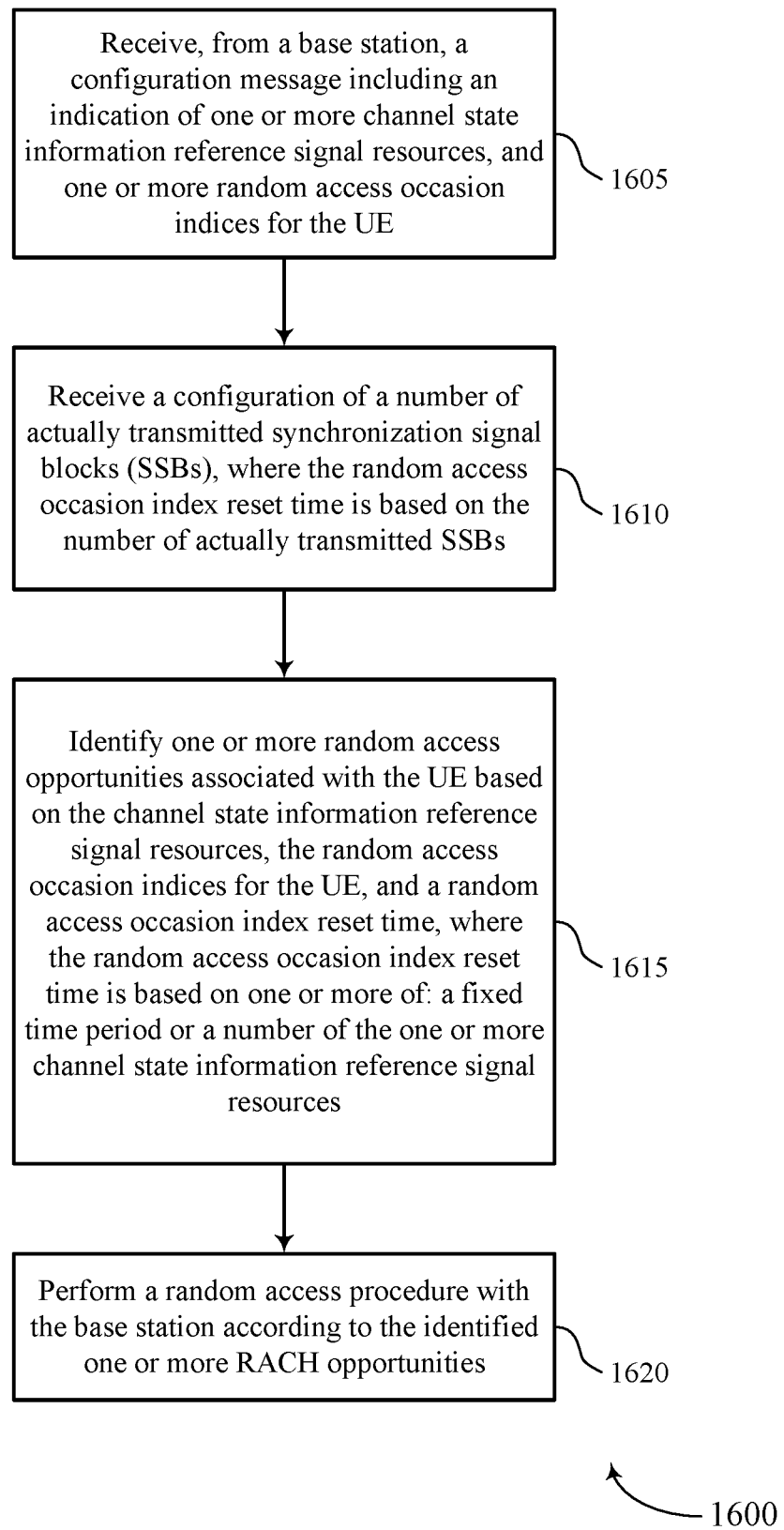
Figure 17:
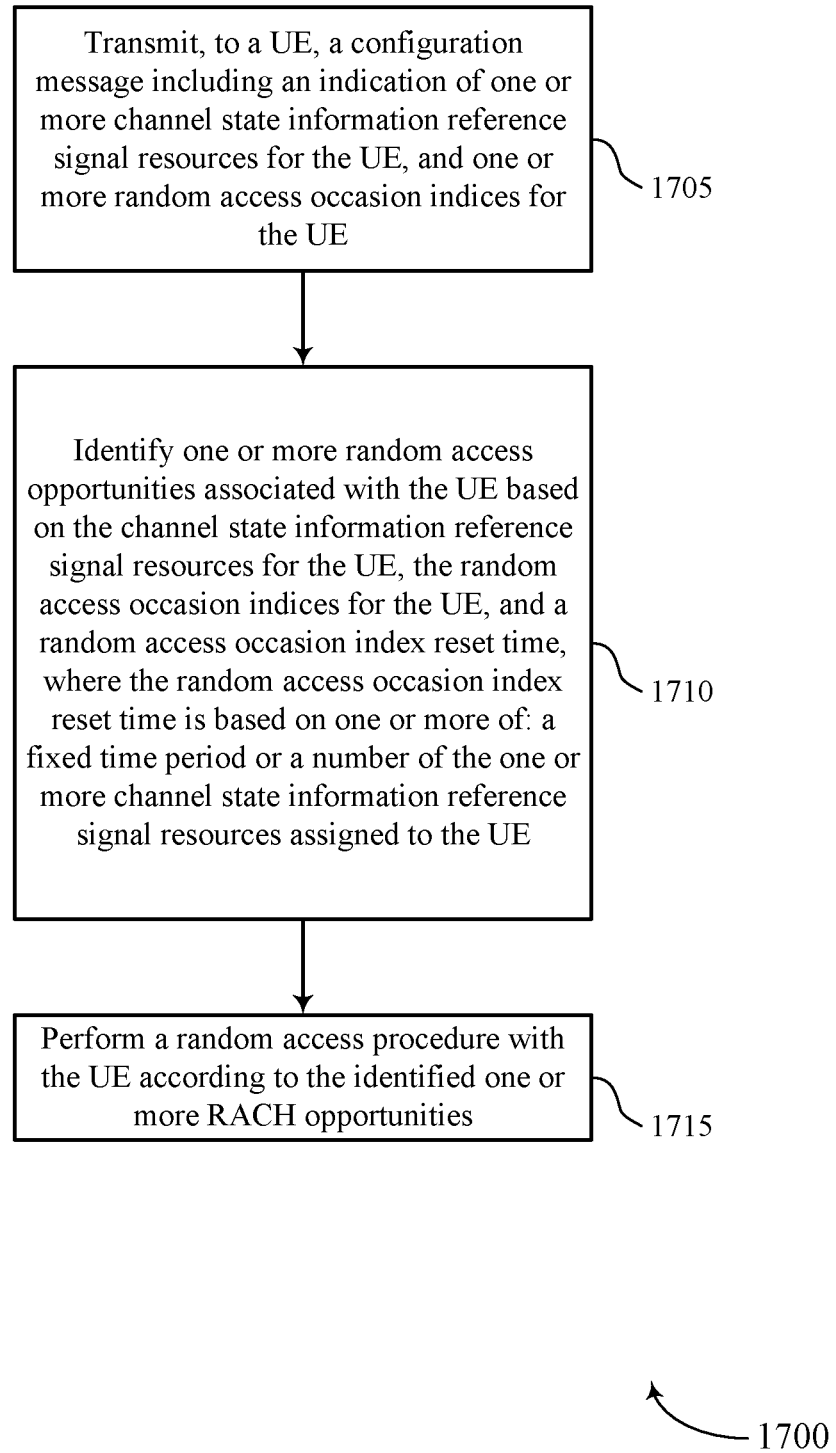

FIG. 16 shows a flowchart illustrating a method 1600 that supports indexing of random access occasions for CSI-RS based random access procedures in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a configuration message including an indication of one or more CSI-RS resources for the UE, and one or more random access occasion indices for the UE. The operations of 1605 may be performed according to the methods described herein. In some examples, aspects of the operations of 1605 may be performed by a configuration message manager as described with reference to FIGS. 8 through 11.

At 1610, the base station may identify one or more random access occasions associated with the UE based on the CSI-RS resources for the UE, the random access occasion indices for the UE, and a random access occasion index reset time, where the random access occasion index reset time is based on one or more of: a fixed time period or a number of the one or more CSI-RS resources assigned to the UE. The operations of 1610 may be performed according to the methods described herein. In some examples, aspects of the operations of 1610 may be performed by a random access occasion manager as described with reference to FIGS. 8 through 11.

At 1615, the base station may perform a random access procedure with the UE according to the identified one or more random access occasions. The operations of 1615 may be performed according to the methods described herein. In some examples, aspects of the operations of 1615 may be performed by a random access procedure manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

In some examples of the above described techniques, for a PRACH transmission triggered by a physical downlink control channel (PDCCH) order, the PRACH mask index field, if the value of the Random Access Preamble index field is not zero, may indicate the PRACH occasion for the PRACH transmission where the PRACH occasions are associated with the synchronization signal (SS)/physical broadcast channel (PBCH) block index indicated by the SS/PBCH block index field of the PDCCH order. The PRACH occasions may be mapped consecutively per corresponding S/PBCH block index. The indexing of the PRACH occasion indicated by the mask index value may reset per mapping cycle of consecutive PRACH occasions per SS/PBCH block index. THE UE may select for a PRACH transmission the PRACH occasion indicated by PRACH masked index value for the indicated SS/PBCH block index in the first available mapping cycle. In some examples, for the indicated preamble index, the ordering of the PRACH occasion may be: first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

In some examples, for PRACH transmissions triggered by higher layer signaling, a ra-OccasionList, if the value of the Random Access Preamble index field is not zero, may indicate the list of PRACH occasions for the PRACH transmissions where the PRACH occasions are associated with the CSI-RS index indicated by csi-RS field of the higher layer signaling. The indexing of the PRACH occasions indicated by the ra-OccasionList may be reset per mapping cycle of consecutive maxRA-Occasion RACH occasions and per a fixed time period (e.g., 160 ms).

In some examples, a network may have some flexibility to configure UEs 115 with contention free random access (CFRA) resources corresponding to any SSB, during handover. Such flexibility may reduce system latency. In some examples, a network may set a value of RA-SSB-Resource up to 64 (e.g., maxRA-SSB-Resources=64 (e.g., in Rel-15)).

In some examples, a UE 115 may determine a value at which indices of random access occasions corresponding to CSI-RS get reset. The UE 115 may further determine a random access configuration index and ra-OccasionList, to properly find the time and frequency location of RACH resources. In some examples, the indexing of CSI-RS may repeat after an amount of time that allows the network to fit in a sufficient number of RACH occasions, corresponding to all of its actually transmitted CSI-RS resources, within that amount of time. In some examples, the amount of time may be set equal to an SSB-RACH association period. However, in such examples, the number of actually transmitted SSBs may be different from the number of actually transmitted CSI-RS for CFRA.

In some examples, the specification may define a fixed reset period (e.g., the indices of CSI-RS based RACH occasions may be reset after a fixed period and may not depend on the number of configured CSIORS resources for CFRA. In such examples, the fixed reset period may be set to a relatively high value, (e.g., 160 ms). If the number of configured FRA-CSI-RS resources is very high, a value of 160-ms will allow network to place all corresponding RACH occasions within 160 ms while keeping overhead low. If the number of configured CFRA-CSI-RS resources is low, the network may still reduce RACH latency by configuring many RACH occasions within the 160 ms while keeping overhead low. If the number of configured CFRA-CSI resources is low, the network may reduce RACH latency by configuring many RACH occasions within the 160 ms period and may inform the UE 115 of the index of all those RACH occasions. In some cases, a fixed time period of 160 ms may contain a higher number of CFRA-CSI-RS occasions than the one indicated by maxRA-Occasions (which may be equal to 512). Hence, the indexing of RACH occasions should also get reset per consecutive maxRA-Occasion RACH occasions. Thus, indexing of PRACH occasions indicated by the ra-OccasionList may be reset per mapping cycle of consecutive maxRA-Occasion RACH occasions and per 160 ms.

In some examples, the reset time period may depend on a number of CSI-RS resources that have been configured for CFRA. In such examples, a relationship between the configured number of CSI-RS resources for CFRA and the corresponding reset period may be defined. The relationship may be signaled to the UE 115, or the UE may be configured to know the relationship.

In some examples, the network may explicitly configure the reset period for CSI-RS based RACH occasions. This may provide flexibility at the network, and may introduce higher layer signaling parameters (e.g., an RRC parameter) for indicating the reset period.

The techniques, apparatuses, and methods described herein may support a network to set the value of RA-SSB-Resources up to 64 (i.e., maxRA-SSB-Resources=64). The techniques, apparatuses, and methods described herein may also support the indexing of the PRACH occasions indicated by the ra-OccasionList to be reset per mapping cycle of consecutive maxRA-Occasion RACH occasions and per 160 ms.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from an access network entity, a configuration message comprising an indication of one or more channel state information reference signal resources, and one or more random access occasion indices for the UE, and a configuration of synchronization signal blocks (SSBs);
   identifying one or more random access occasions associated with the UE based at least in part on the one or more channel state information reference signal resources, the one or more random access occasion indices for the UE, and a random access occasion index reset time, wherein a ratio between the random access occasion index reset time and an SSB random access association period is equal to a ratio between a quantity of actually transmitted SSBs and a quantity of the one or more channel state information reference signal resources; and
   performing a random access procedure with the access network entity according to the identified one or more random access occasions.

2. The method of claim 1, further comprising:
   receiving an indication of a fixed time period from the access network entity, wherein the random access occasion index reset time is based at least in part on the fixed time period.

3. The method of claim 2, wherein the fixed time period includes the one or more random access occasions associated with the UE.

4. The method of claim 2, wherein the indication is received in system information, downlink control information, a media access control control element (MAC-CE), a radio resource control (RRC) signal, a handover report, or any combination thereof.

5. The method of claim 1, wherein the random access occasion index reset time is based at least in part on a fixed time period that is standardized.

6. The method of claim 1, further comprising:
   receiving an indication of a quantity of the one or more channel state information reference signal resources from the access network entity, wherein the random access occasion index reset time is based at least in part on the quantity of the one or more channel state information reference signal resources.

7. The method of claim 6, wherein the quantity of the one or more channel state information reference signal resources is equal to a quantity of channel state information reference signals configured for contention free random access transmission by the UE.

8. The method of claim 6, wherein the quantity of the one or more channel state information reference signal resources is a total quantity of channel state information reference signal resources associated with corresponding random access occasions at the access network entity.

9. A method for wireless communications at an access network entity, comprising:
   transmitting, to a UE, a configuration message comprising an indication of one or more channel state information reference signal resources for the UE, and one or more random access occasion indices for the UE, and a configuration of synchronization signal blocks (SSBs);
   identifying one or more random access occasions associated with the UE based at least in part on the one or more channel state information reference signal resources for the UE, the one or more random access occasion indices for the UE, and a random access occasion index reset time, wherein a ratio between the random access occasion index reset time and an SSB random access association period is equal to a ratio between a quantity of actually transmitted SSBs and a quantity of the one or more channel state information reference signal resources; and performing a random access procedure with the UE according to the identified one or more random access occasions.

10. The method of claim 9, further comprising:
transmitting an indication of a fixed time period to the UE, wherein the random access occasion index reset time is based at least in part on the fixed time period.

11. The method of claim 10, wherein the fixed time period includes the one or more random access occasions associated with the UE.

12. The method of claim 10, wherein the indication is transmitted in system information, downlink control information, a media access control element (MAC-CE), a radio resource control (RRC) signal, a handover report, or any combination thereof.

13. The method of claim 9, wherein the random access occasion index reset time is based at least in part on a fixed time period that is standardized.

14. The method of claim 9, further comprising:
transmitting an indication of a quantity of the one or more channel state information reference signal resources to the UE, wherein the random access occasion index reset time is based at least in part on the quantity of the one or more channel state information reference signal resources.

15. The method of claim 14, wherein the quantity of the one or more channel state information reference signal resources is equal to a quantity of channel state information reference signals configured for contention free random access transmission by the UE.

16. The method of claim 14, wherein the quantity of the one or more channel state information reference signal resources is a total quantity of channel state information reference signal resources associated with corresponding random access occasions at the access network entity.

17. An apparatus for wireless communications at a user equipment (UE), comprising: a processor, memory in electronic communication with the processor; and instructions stored in the memory and executable by the processor to cause the apparatus to:
receive, from an access network entity, a configuration message comprising an indication of one or more channel state information reference signal resources, and one or more random access occasion indices for the UE, and a configuration of synchronization signal blocks (SSBs);
identify one or more random access occasions associated with the UE based at least in part on the one or more channel state information reference signal resources, the one or more random access occasion indices for the UE, and a random access occasion index reset time, wherein a ratio between the random access occasion index reset time and an SSB random access association period is equal to a ratio between a quantity of actually transmitted SSBs and a quantity of the one or more channel state information reference signal resources; and
perform a random access procedure with the access network entity according to the identified one or more random access occasions.

18. The apparatus of claim 17, wherein the instructions are further executable by the processor to cause the apparatus to:
receive an indication of a fixed time period from the access network entity, wherein the random access occasion index reset time is based at least in part on the fixed time period.

19. The apparatus of claim 18, wherein the fixed time period includes the one or more random access occasions associated with the UE.

20. The apparatus of claim 18, wherein the indication is received in system information, downlink control information, a media access control control element (MAC-CE), a radio resource control (RRC) signal, a handover report, or any combination thereof.

21. The apparatus of claim 17, wherein the random access occasion index reset time is based at least in part on a fixed time period that is standardized.

22. The apparatus of claim 17, wherein the instructions are further executable by the processor to cause the apparatus to:
receive an indication of a quantity of the one or more channel state information reference signal resources from the access network entity, wherein the random access occasion index reset time is based at least in part on the quantity of the one or more channel state information reference signal resources.

23. The apparatus of claim 22, wherein the quantity of the one or more channel state information reference signal resources is equal to a quantity of channel state information reference signals configured for contention free random access transmission by the UE.

24. An apparatus for wireless communications at an access network entity, comprising: a processor, memory in electronic communication with the processor; and instructions stored in the memory and executable by the processor to cause the apparatus to:
transmit, to a UE, a configuration message comprising an indication of one or more channel state information reference signal resources for the UE, and one or more random access occasion indices for the UE, and a configuration of synchronization signal blocks (SSBs);
identify one or more random access occasions associated with the UE based at least in part on the one or more channel state information reference signal resources for the UE, the one or more random access occasion indices for the UE, and a random access occasion index reset time, wherein a ratio between the random access occasion index reset time and an SSB random access association period is equal to a ratio between a quantity of actually transmitted SSBs and a quantity of the one or more channel state information reference signal resources; and
perform a random access procedure with the UE according to the identified one or more random access occasions.

25. The apparatus of claim 24, further comprising transmitting an indication of a fixed time period to the UE, wherein the random access occasion index reset time is based at least in part on the fixed time period.

* * * * *